US009275509B2

(12) United States Patent
Scholtz

(10) Patent No.: US 9,275,509 B2

(45) Date of Patent: Mar. 1, 2016

(54) METHODS AND DEVICES FOR INCREMENTAL WAGERING TO EARN MULTIPLE PRIZES PER WINNING WAGER

(75) Inventor: Antoine Joubert Scholtz, Durban (ZA)

(73) Assignee: Corg Group Trading LTD., Road Town, Tortola (VG)

( * ) Notice: Subject to any disclaimer, the term of this patent is extended or adjusted under 35 U.S.C. 154(b) by 836 days.

(21) Appl. No.: 12/626,652

(22) Filed: Nov. 26, 2009

(65) Prior Publication Data

US 2011/0124400 A1 May 26, 2011

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ............ *G07F 17/32* (2013.01); *G07F 17/3244* (2013.01); *G07F 17/3262* (2013.01); *G07F 17/3267* (2013.01)

(58) Field of Classification Search

CPC . G07F 17/32; G07F 17/3244; G07F 17/3262; G07F 17/3267

USPC ........................ 463/16–20, 25, 29–31, 40–43

See application file for complete search history.

(56) References Cited

U.S. PATENT DOCUMENTS

| | | | | |
|---|---|---|---|---|
| 6,089,976 | A * | 7/2000 | Schneider et al. | 463/16 |
| 6,319,124 | B1 * | 11/2001 | Baerlocher et al. | 463/20 |
| 6,443,837 | B1 * | 9/2002 | Jaffe et al. | 463/16 |
| 6,602,135 | B1 * | 8/2003 | Gerrard | 463/16 |
| 6,676,512 | B2 * | 1/2004 | Fong et al. | 463/20 |
| 6,692,356 | B2 * | 2/2004 | Baerlocher et al. | 463/20 |
| 7,014,559 | B1 | 3/2006 | Fong | |
| 7,455,585 | B2 | 11/2008 | Englman | |
| 2001/0046893 | A1 * | 11/2001 | Giobbi et al. | 463/24 |
| 2002/0155881 | A1 * | 10/2002 | Yoshida | 463/20 |
| 2003/0013519 | A1 * | 1/2003 | Bennett | 463/25 |
| 2003/0224850 | A1 * | 12/2003 | Anderson et al. | 463/20 |
| 2004/0137979 | A1 * | 7/2004 | Rose | 463/16 |
| 2005/0049038 | A1 * | 3/2005 | Cuddy et al. | 463/25 |
| 2007/0060299 | A1 * | 3/2007 | Nelson et al. | 463/20 |
| 2008/0004102 | A1 | 1/2008 | Kojima | |
| 2009/0036203 | A1 * | 2/2009 | Anderson et al. | 463/26 |

(Continued)

OTHER PUBLICATIONS

Lam, Benjamin, Examiner's first report on patent application No. 2010241503, Australian Government—IP Australia, 2 pages, Nov. 18, 2011.

(Continued)

*Primary Examiner* — Milap Shah

(74) *Attorney, Agent, or Firm* — McDonnell Boehnen Hulbert & Berghoff LLP

(57) ABSTRACT

Methods, devices, and systems provide means for carrying out video events on which wagers are placed. The wagers may be won, lost, or returned. Multiple prizes, including a main prize and a bonus prize, are awarded for each winning wager. Execution of the video events causes multiple event symbols to be displayed on a display. The event symbols may represent symbols on multiple reels that are spun during each video event, or playing cards that are dealt from a simulated deck of playing cards during each video event. For each video event, a prize symbol may be randomly assigned to each of the two or more displayed event symbols. An event symbol displayed for a winning wager may be selected via a symbol selector. The selected event symbol may be replaced with a prize symbol to reveal the bonus prize for the winning wager.

24 Claims, 12 Drawing Sheets

(56) References Cited

U.S. PATENT DOCUMENTS

| | | | | |
|---|---|---|---|---|
| 2009/0075716 | A1* | 3/2009 | Seelig et al. | 463/20 |
| 2010/0304825 | A1* | 12/2010 | Davis et al. | 463/17 |

OTHER PUBLICATIONS

U.S. Appl. No. 11/978,876, filed Oct. 29, 2007.
U.S. Appl. No. 12/580,607, filed Oct. 16, 2009.

* cited by examiner

METHODS AND DEVICES FOR INCREMENTAL WAGERING TO EARN MULTIPLE PRIZES PER WINNING WAGER

BACKGROUND

This disclosure relates generally to the field of wagering events and more particularly to methods and devices for incremental wagering and awarding prizes for winning wagers. The methods are applicable to a variety of devices that are operable to carry out the incremental wagering.

Electronic device providers compete against each other to bring forth electronic devices that consumers want to use and/or purchase. The electronic device providers have always been concerned with profitability, but have increasingly become more concerned with how the manufacture and disposal of the electronic devices affects the environment. Thus a goal of many electronic device providers is to produce electronic devices that will be used repeatedly and more often, relative to competing electronic devices, such that the production of the electronic devices enhances profitability and the electronic devices are not disposed of sooner than expected or necessary.

OVERVIEW

The accompanying description describes example embodiments for carrying out video events for which wagers may be placed. In order to generate enthusiasm for using devices that carry out the video events, multiple prizes, such as a main prize and a bonus prize, may be awarded for each winning wager. Moreover, each bonus prize may be awarded prior to initiation of a next video event and can be determined by selecting a symbol that indicates the wager is a winning wager.

In one respect, an example embodiment takes the form of a method that includes (i) displaying two or more event symbols on a display associated with a video device, wherein the two or more event symbols indicate that a wager placed on a video event carried out at the video device is a winning wager, (ii) determining a main prize for the winning wager, (iii) identifying a selected event symbol, wherein the selected event symbol is one of the two or more event symbols that indicate the wager placed on the video event is a winning wager, and wherein each event symbol of the two or more event symbols other than the selected event symbol is a non-selected event symbol, and (iv) displaying each non-selected event symbol of the two or more event symbols and a prize symbol on the display, wherein the prize symbol identifies a bonus prize for the winning wager and is displayed in place of the selected event symbol.

In another respect, an example embodiment takes the form of a device useable to carry out one or more video events. The example device comprises (i) a display that is operable to visually present two or more event symbols that indicate a wager placed on a first video event carried out at the video device is a winning wager, (ii) a data storage device containing computer-readable program instructions, and (iii) a processor that is operable to execute the computer-readable program instructions. The computer-readable program instructions comprise program instructions that are executable to determine a main prize for the winning wager and a bonus prize for the winning wager. The bonus prize is determined from a selection of one of the two or more event symbols that indicate the wager placed on the first video event is a winning wager.

In yet another respect, an example embodiment takes the form of a method that includes (i) initiating a video event via a device, (ii) displaying, on a display associated with the device, two or more event symbols that indicate a wager placed on the video event is a winning wager, (iii) displaying, on the display, a main prize awarded for the winning wager, (iv) receiving selection information that identifies one event symbol of the two more event symbols as a selected event symbol, wherein each event symbol of the two or more event symbols other than the selected event symbol is a non-selected event symbol, and (v) displaying each non-selected event symbol of the two or more event symbols and a prize symbol on the display, wherein the prize symbol identifies a bonus prize for the winning wager and is displayed in place of the selected event symbol.

In still yet another respect, an example embodiment takes the form of a method that includes (i) receiving, at a server from a client device, a message to initiate a video event at the client device, (ii) determining, at the server, that a wager placed on the video event is a winning wager, (iii) determining, at the server, a main prize for the winning wager, (iv) transmitting, from the server to the client device, a message including data that causes a given set of event symbols to be displayed on a display associated with the client device, wherein the given set of event symbols comprises two or more event symbols that indicate the wager placed on the video event is a winning wager, (v) receiving, at the server from the client device, a message that identifies a selected event symbol, wherein the selected event symbol is one of the two or more event symbols that indicate the wager placed on the video event is a winning wager, and (vi) determining, at the server, a bonus prize for the winning wager, wherein the bonus prize is randomly assigned by the server to the selected event symbol.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments of the invention are described herein with reference to the drawings, in which.

DETAILED DESCRIPTION

1. Introduction

Figure 1:
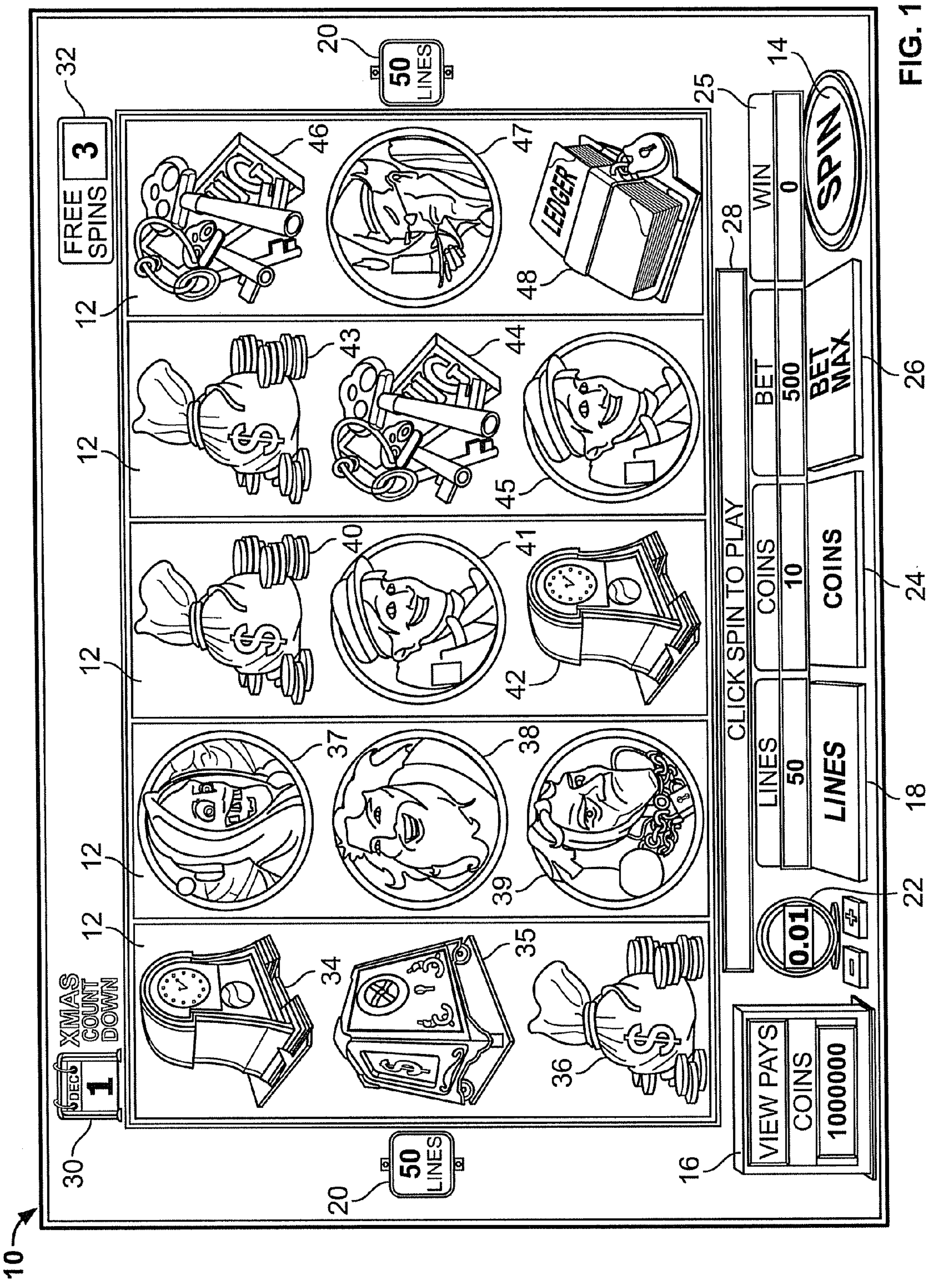
FIG. 1, FIG. 2, FIG. 3, FIG. 4, and FIG. 5 are example images that may be visually presented on a display associated with an example device.

This description discloses, among other things, methods, devices, and systems for carrying out video events. The video events may be carried out by a device or a combination of devices described in this description, and one or more of the video events may be referred to as a video event session. After completing a video event session at a given device, a user may leave that device and return to the same device or another device some time thereafter to carry out another video event session. Additionally or alternatively, a user may sign off (e.g., log off) the given device to complete a video event session and some time thereafter sign back on (e.g., log on) to the same device or another device so as to carry out another video event session. Other examples of carrying out multiple video event sessions are also possible.

The example video events described in this description may be carried out by a device used by a user to place a wager on a video event. The wager may be made with a house (e.g., a casino operator). Multiple video event symbols may be presented on a display during each video event. The multiple event symbols may indicate an outcome of the wager placed on a video event. The outcome of the wager may be a losing wager in which a device user loses the wager and the house wins the wager. Alternatively, the outcome of the wager may be a tie in which neither the device user nor the house wins or loses the wager, or a winning wager in which the device user wins the wager and the house loses the wager.

For the example video events, a wager won by the user may result in the user being awarded two prizes, namely a main prize and a bonus prize. The main prize may be determined from a pre-determined pay table that identifies the prize based, at least in part, on the user's wager. The bonus prize may be determined via selection of an event symbol that is associated with the winning wager. For instance, the event symbol of the winning wager may comprise an event symbol on a winning pay-line of a video event in which multiple reels comprising the event symbols are spun, or an event symbol representing a playing card in a user's hand of playing cards.

Each event symbol associated with the winning wager may be randomly assigned a bonus prize. The bonus prize may be assigned to the event symbol at any time during the video event, such as prior to determining that the wager is a winning wager, at the time the wager is determined to be a winning wager, after an event symbol is selected, or at some other time. In one respect, a user engaging in the video event may select an event symbol to reveal the bonus prize. The bonus prize may be revealed upon selection of the event symbol. In another respect, if the user does not select an event symbol, a device being used to carry out the video event may select an event symbol so as to determine the bonus prize.

U.S. Pat. No. 7,455,585 pertains to accumulation of award opportunities during a slot game. A problem with the prior art is that the users of known wagering devices are not provided with the opportunity to select a bonus prize for each winning wager prior to placing a subsequent wager. As described in the example embodiments, this problem may be overcome by awarding bonus prizes for each winning wager in response to a selection of an event symbol that indicates the wager is a winning wager. Implementing the example methods and devices will increase user demand such that the owners of the devices will be less inclined to dispose of the devices relative to other devices.

2. Example Video Events

An example video event that may be carried out in an example embodiment is a video multi-reel slot event that simulates spinning reels of a mechanical multi-reel slot machine. A video multi-reel slot event may be carried out on a stand-alone video device, a server, or a client device that functions in cooperation with a server. During a video multi-reel slot event, each of the simulated reels (hereinafter "reels") is operable to spin independently of the other reels. Each of the reels may be located about a common horizontal axis such that the reels are operable to spin in a vertical direction about the horizontal axis. Each reel is associated with multiple event symbols. A display may visually present an image of an array of event symbols. As an example, the array of event symbols may comprise M rows of symbols and N columns of symbols. For the example video multi-reel slot events, M is greater than or equal to one and N is greater than or equal to two.

FIG. 1 illustrates an example image 10 that may be visually presented on a display in accordance with an example embodiment. In general, image 10 comprises an image that is presented on a display for an example video multi-reel slot event. In particular, image 10 comprises reels 12, a video event trigger 14, a user account display 16, a pay-line selector 18, pay-line quantity identifiers 20, a coin value selector 22, a coin-per-pay-line selector 24, a prize display 25, a maximum bet selector 26, and a user message display 28.

Video event trigger 14 is operable to trigger initiation of a next video event. For the example video multi-reel slot events, video event trigger 14 may comprise a trigger on a graphical user interface (GUI). The GUI trigger may be labeled "SPIN." For an example video playing card event, a video event trigger on a GUI may be labeled "DEAL." Additionally or alternatively, a video event trigger that initiates the next occurrence of a video event may comprise a non-GUI trigger switch, such as a key on a keypad or a push-button switch. Other examples of video event triggers and labels on a video event trigger are also possible.

The reels 12 comprise symbol positions 34 through 48. In FIG. 1, an event symbol is displayed at each of the symbol positions 34 through 48. The array of event symbols in image 10 comprises M rows and N columns, where M=3 and N=5. Each of the N columns is in the form of a reel 12, and each reel 12 displays one event symbol per row. One or more of the event symbols displayed at symbol positions 34 through 48 may comprise a single still image or multiple still images that may be displayed in a given sequence. Displaying the multiple still images in the given sequence may be carried out to represent motion. When video event trigger 14 is engaged, the display may begin presenting images that show each of the reels 12 spinning. When the reels 12 stop spinning, a different array of event symbols may be displayed at symbol positions 34 through 48. The array of event symbols provides an indication of whether the wager placed on the video event is a winning or losing wager.

User account display 16 is operable to display status of a user account. In image 10, user account display 16 displays a quantity of coins in the user account. Alternatively, user account 16 may display a quantity of some other items, such as tokens, credits, or dollars. The value displayed on user account display 16 may be decreased when a wager is placed or when a wager is lost. The value displayed on user account display 16 may be increased when a wager is won.

Pay-line selector 18 is operable by a user to select a quantity of pay-lines used to determine whether a wager placed on a video event is a winning wager. Pay-line selector 18 may display a numeric value (e.g., 50, as shown in FIG. 1) that identifies the quantity of pay-lines selected via pay-line selector 18. Pay-line quantity identifiers 20 are operable to display the quantity of pay-lines selected via pay-line selector 18.

Coin value selector 22 is operable by a user to select a value of each coin in the user account. In image 10, by way of example, each of the 1,000,000 coins in the user account is valued at 0.01 (e.g., 0.01 United States Dollars (i.e., a penny)). Coin value selector 22 may be used to increase or decrease the value of each coin in the user account. When the value of each coin in the user account is increased, the quantity of coins in the user account may be decreased. For example, if each of the 1,000,000 coins in the user account has a value of 0.01 and if the value of each coin is changed to a value of 0.25, then the quantity of coins displayed by user account display 16 may be changed to 40,000 coins. When the value of each coin in the user account is decreased, the quantity of coins in the user account may be increased.

Coin-per-pay-line selector 24 is operable by a user to select a quantity of coins to be wagered on each pay-line for each video event. Coin-per-pay-line selector 24 may be operable to display the quantity of coins (e.g., 10 coins per pay-line) selected by coin-per-pay-line selector 24.

Prize display 25 is operable to display a quantity of coins or other items won during a video event. For a winning wager, prize display 25 is operable to display a main prize (e.g., a number of coins greater than zero) that is won during the video event. In image 10, prize display 25 displays a zero. For the example video multi-reel slot event, a zero may be displayed via prize display 25 as a result of losing a wager during a video event.

Maximum bet selector 26 is operable by a user select the maximum number of coins to wager during a video event. Maximum bet selector 24 may be operable to display the quantity of coins (e.g., 500 coins) selected by maximum bet selector 26 or as a result of the maximum number of pay-lines selected via pay-line selector 18 and the maximum number of coins selected via coin-per-pay-line selector 24. Engaging the maximum bet selector 26 may be an alternative way to initiate the next video event.

Figure 4:
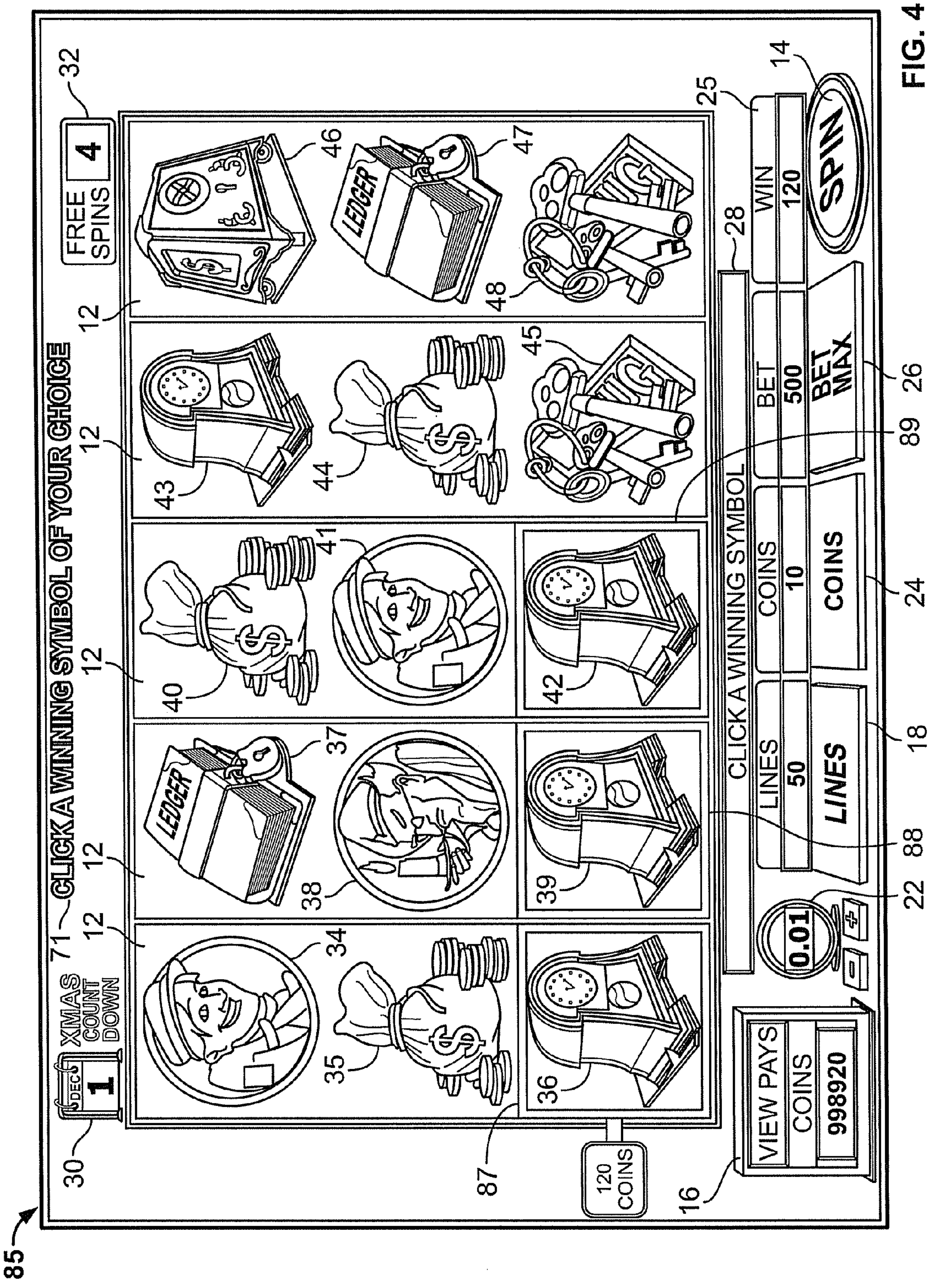

User message display 28 is operable to display prompts to a user engaging a device to carry out the video events. In image 10, message display 28 displays "CLICK SPIN TO WIN" so as to prompt a user to engage video event trigger 14. After a determination is made that a wager placed on a video event is a winning wager, user message display 28 may display "CLICK A WINNING SYMBOL," as shown in FIG. 4, so as to prompt a user to select an event symbol on a winning pay-line.

Figure 11:
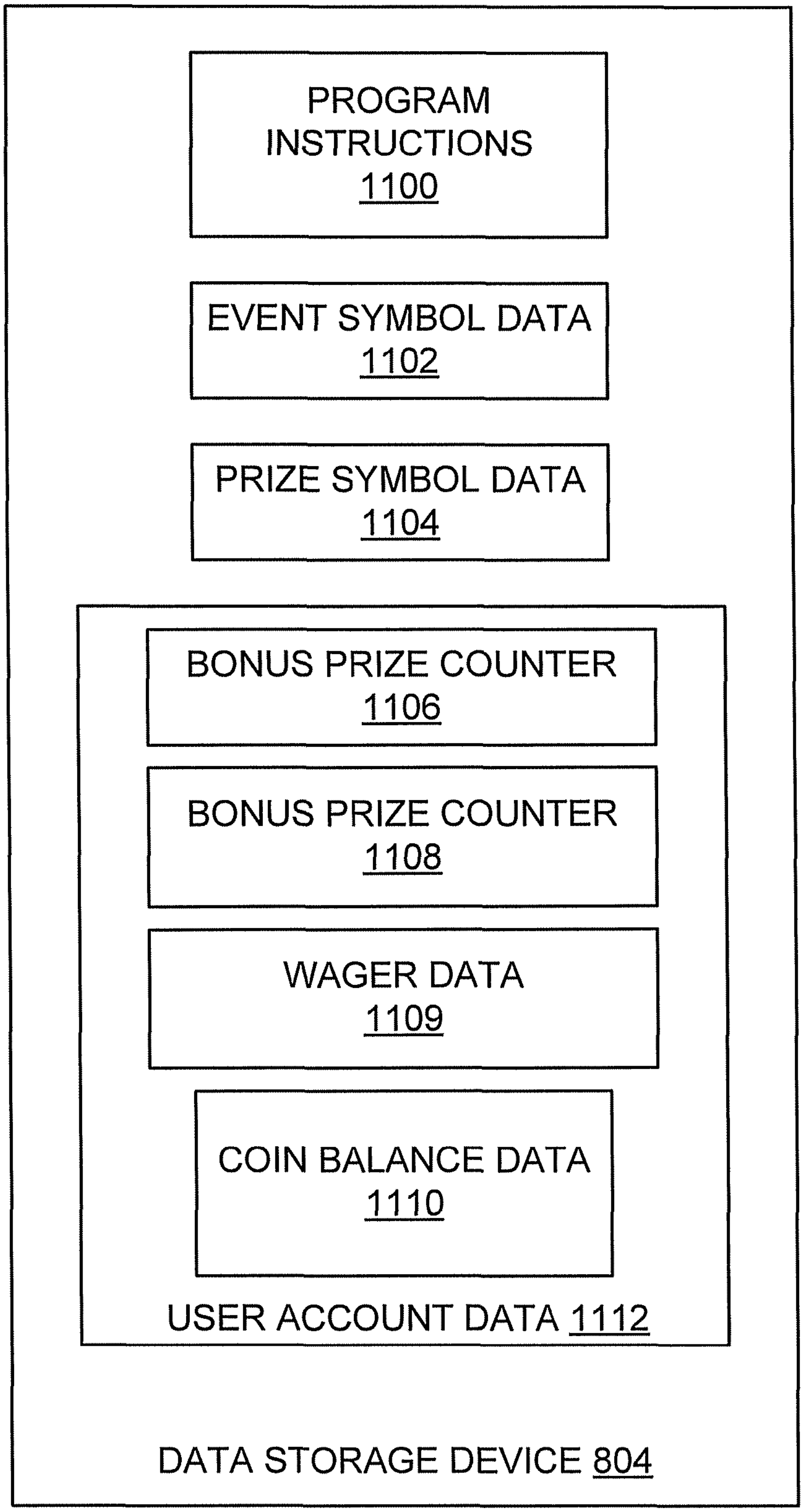
FIG. 11 is a block diagram depicting example data that may be contained in a data storage device.

As shown in FIG. 1, image 10 further includes counter displays 30, 32. Counter displays 30, 32 visually present a balance of counters that track the quantity of bonus prizes awarded for winning wagers placed on the video events. Examples of these counters are shown in FIG. 11 (i.e., bonus prize counters 1106, 1108). In this regard, counter display 30 may represent a quantity of bonus prizes being tracked in bonus prize counter 1106, and counter display 32 may represent a quantity of bonus prizes being tracked in bonus prize counter 1108.

As an example, the video multi-reel slot event may have a Christmas theme such that the event symbols and prize symbols displayable on reels 12 comprise images having a Christmas theme. One or more bonus prizes winnable for a wager placed on a video event may also have a Christmas theme. A bonus prize winnable for a wager placed on a video event represented by images 10, 70, 80, 85, and 90 is changing-a-date-on-a-count-down-calendar having a range from December 1$^{st}$ to December 25$^{th}$. Bonus prize counter 1106 may contain data that represents a current date on the count-down calendar. In this regard, when images 10, 70, 80, and 85 are displayed, the data of bonus prize counter 1106 may comprise data having a value of 1 to represent the 1$^{st}$ day of December. When image 90 is displayed, the data of bonus prize counter 1106 may comprise data having a value of 2 to represent the 2$^{nd}$ day of December. For this example, the values of data in bonus value counter 1106 may increase each time the changing-a-date-on-a-count-down-calendar bonus prize is won. For this example, valid values of counter 1106 may include the whole numbers between and including 1 through 25.

As another example, the video multi-reel slot event may have a space-travel theme such that the event symbols and prize symbols displayable on reels 12 comprise images having a space-travel theme. One or more bonus prizes winnable for a winning wager placed on the video multi-reel slot event may also have a space-travel theme. For instance, a bonus prize winnable for a winning wager placed on the video multi-reel slot event having a space-travel theme may comprise a changing-a-time-on-a-count-down-timer, such as time used when launching a rocket ship. For this example, bonus prize counter 1106 may contain data that represents a current number of seconds, such as a number between 10 and 0. For this example, the values of data in bonus value counter 1106 may decrease by a value of 1 each time the changing-a-time-on-a-count-down-timer bonus prize is won.

In accordance with the example video multi-reel slot events, when bonus prize counter 1106 reaches a threshold value, such as 25 for the Christmas count-down calendar or 0 for the rocket ship count-down timer, the bonus prizes being tracked in another bonus prize counter, such as bonus prize counter 1108, may become redeemable. Alternatively, the bonus prizes being tracked in bonus prize counter 1108 may be redeemable even if the bonus prize counter 1106 does not reach the threshold value. The bonus prizes being tracked in bonus prize counter 1108 may be free video events, such as a free video multi-reel slot event in which a user's account is not decreased for a wager placed on the event.

Figure 2:
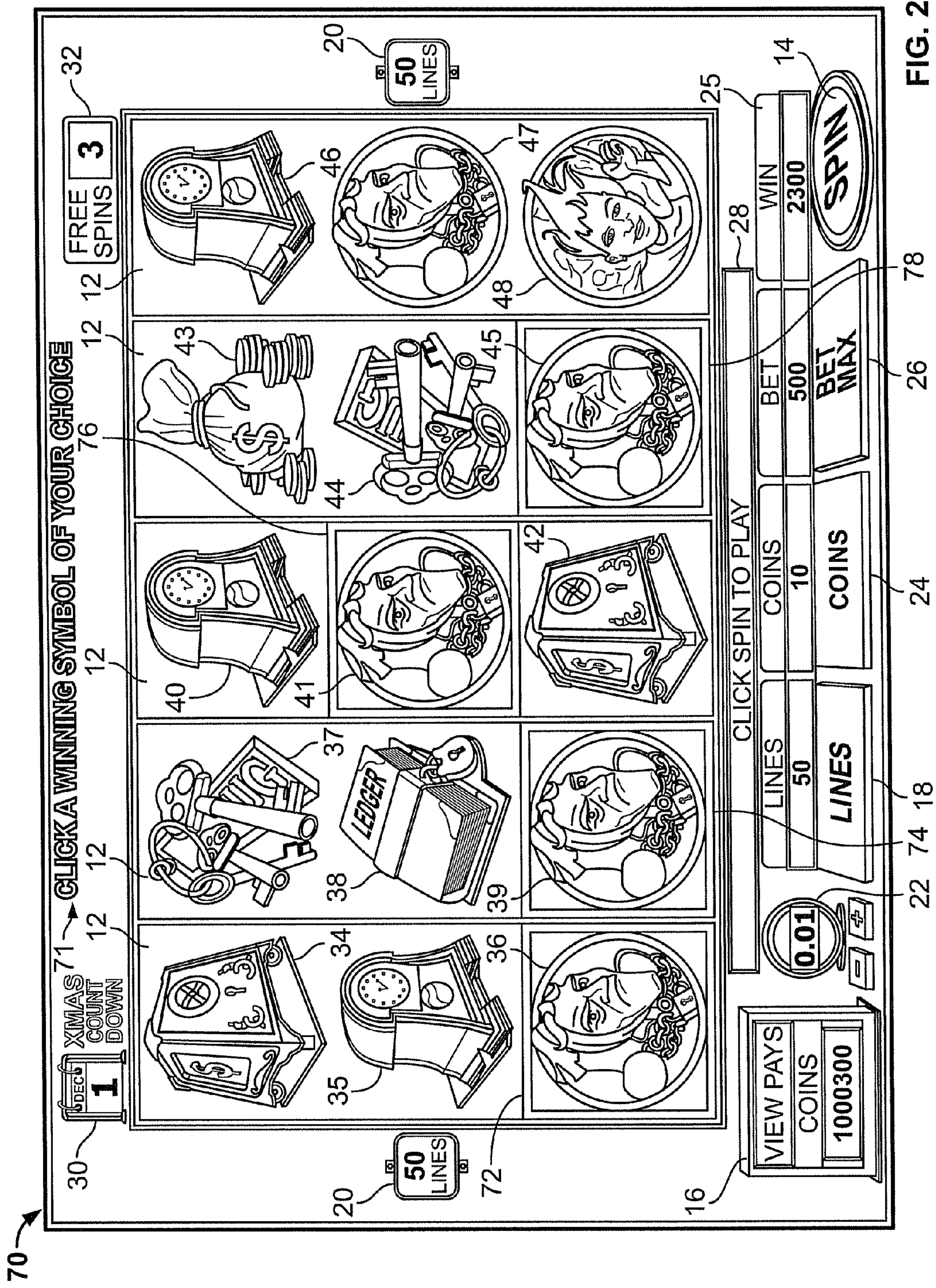

Next, FIG. 2 illustrates an example image 70 that may be visually presented on a display in accordance with an example embodiment. Image 70 may be displayed for a winning wager placed on a video multi-reel slot event that is initiated when account display 16 indicates a balance of 998,500 coins. In FIG. 2, prize display 25 indicates that the main prize for the winning wager is 2,300 (e.g., 2,300 coins), and account display 16 indicates a balance of 1,000,300 coins (i.e., starting balance (998,500 coins)−bet (500 coins)+main prize (2,300 coins)=ending balance (1,000,300 coins).

Image 70 includes symbol frames 72, 74, 76, and 78 that identify event symbols on a winning pay-line for the winning wager of the video multi-reel slot event. The pay-line includes the event symbols at symbol positions 36, 39, 41, and 45. Image 70 includes a user prompt 71. In FIG. 2, user prompt 71 states "CLICK A WINNING SYMBOL OF YOUR CHOICE" so as to prompt a user to select one of the symbols on the pay-line of image 70. Selecting an event symbol on the winning pay-line reveals a bonus prize for the winning wager. Prior to selection of an event symbol on the pay-line shown in FIG. 2, counter display 30 indicates that the XMAS count-down (i.e., the Christmas count-down calendar) is at December 1$^{st}$, and counter display 32 indicates that 3 free spins have been won.

A symbol selector may be used to select an event symbol on the pay-line so as to reveal a bonus prize for the winning wager. The symbol selector may be arranged in any of a variety of configurations. For example, the symbol selector may comprise a touch screen that is operable to select an event symbol. As another example, the symbol selector may comprise a computer mouse that is operable to move a displayed pointer (not shown) to the symbol to be selected and to make a selection when the pointer is pointing to the desired event symbol. Other example arrangements of the symbol selector are also possible.

Computer-readable program instructions, such as program instructions 1100 shown in FIG. 11, may be arranged in various ways to respond to operation of the symbol selector. For example, if the symbol selector is used to select an event symbol on a winning pay-line, such as symbol 41 in FIG. 2, the program instructions may cause the selected event symbol to be replaced with a prize symbol that reveals a bonus prize for the wager placed on the video event. As another example, if the symbol selector is used to select an event symbol that is not on the winning pay-line, such as symbol 34 in FIG. 2, the program instructions may cause the selected event symbol to change to a message symbol that states to "THIS IS NOT A WINNING SYMBOL" or some other message symbol to prompt a user to select another event symbol. Alternatively, the program instructions may cause an audible prompt to be played out if the selected event symbol is not on the wining pay-line. The audible prompt may prompt the user to select another event symbol.

Figure 3:
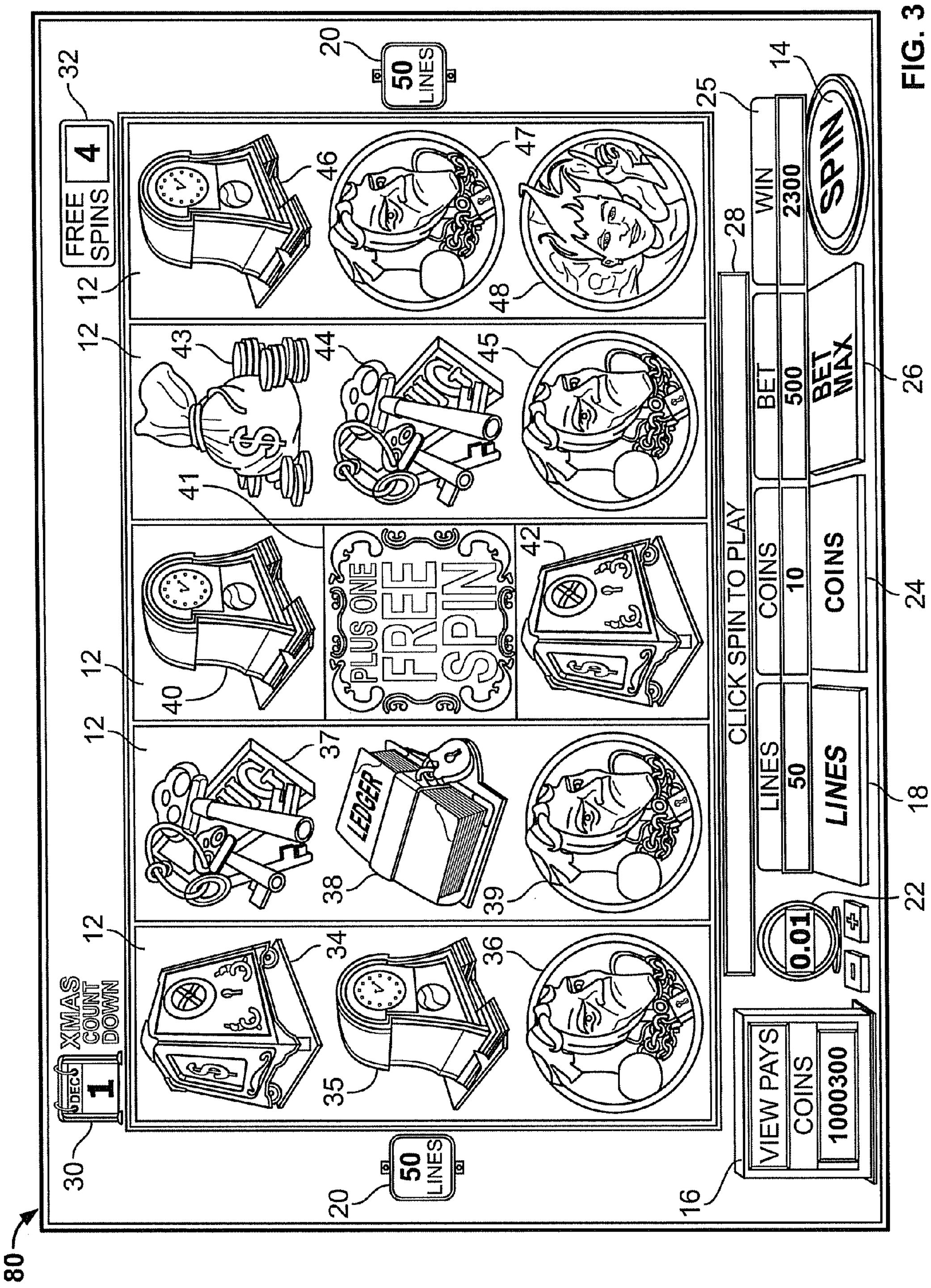

Next, FIG. 3 illustrates an example image 80 that may be visually presented on a display in accordance with an example embodiment. A display may present image 80 in response to the event symbol at symbol location 41, as shown in FIG. 2, being selected via a symbol selector. In FIG. 3, a prize symbol is displayed at symbol location 41. The prize symbol indicates that the user has won one free spin of the video event. As a result of winning the free spin, counter display 32 indicates that the accumulated free spins are 4. Since a winning symbol has been selected, user prompt 71 no longer displays the message "CLICK A WINNING SYMBOL OF YOUR CHOICE." Additionally, user message display 28 displays "CLICK SPIN TO PLAY" so as to prompt a user of a device to initiate the next video multi-reel slot event.

Next, FIG. 4 illustrates an example image 85 that may be visually presented on a display in accordance with an example embodiment. A display may visually present image 85 for another winning wager placed on a video multi-reel slot event that occurs after the winning wager that is represented by the images 70 and 80. Image 85 may be displayed for a winning wager of a video event that is initiated when account display 16 indicates a balance of 999,300 coins. In FIG. 3, prize display 25 indicates that the main prize for the winning wager is 120 (e.g., 120 coins), and account display 16 indicates a balance of 998,920 coins (i.e., starting balance (999,300 coins)−bet (500 coins)+main prize (120 coins)= ending balance (998,920 coins).

Image 85 includes symbol frames 87, 88, and 89 that identify event symbols on a winning pay-line for the winning wager of the video multi-reel slot event. The pay-line includes the symbols at symbol positions 36, 39, and 42. User prompt 71 states "CLICK A WINNING SYMBOL OF YOUR CHOICE" so as to prompt a user to select one of the event symbols on the pay-line of image 85. A symbol selector may be used to select an event symbol on the pay-line so as to reveal a bonus prize for the winning wager. Prior to selection of an event symbol on the pay-line of image 85, counter display 30 indicates that the XMAS countdown is at December $1^{st}$ and the counter display 32 indicates that the accumulated free spins is 4. In FIG. 4, user message display 28 displays the message "CLICK A WINNING SYMBOL" so as to prompt the user to select an event symbol on the winning pay-line. Selecting an event symbol on the winning pay-line reveals a bonus prize for the winning wager placed on the video multi-reel slot event.

Figure 5:
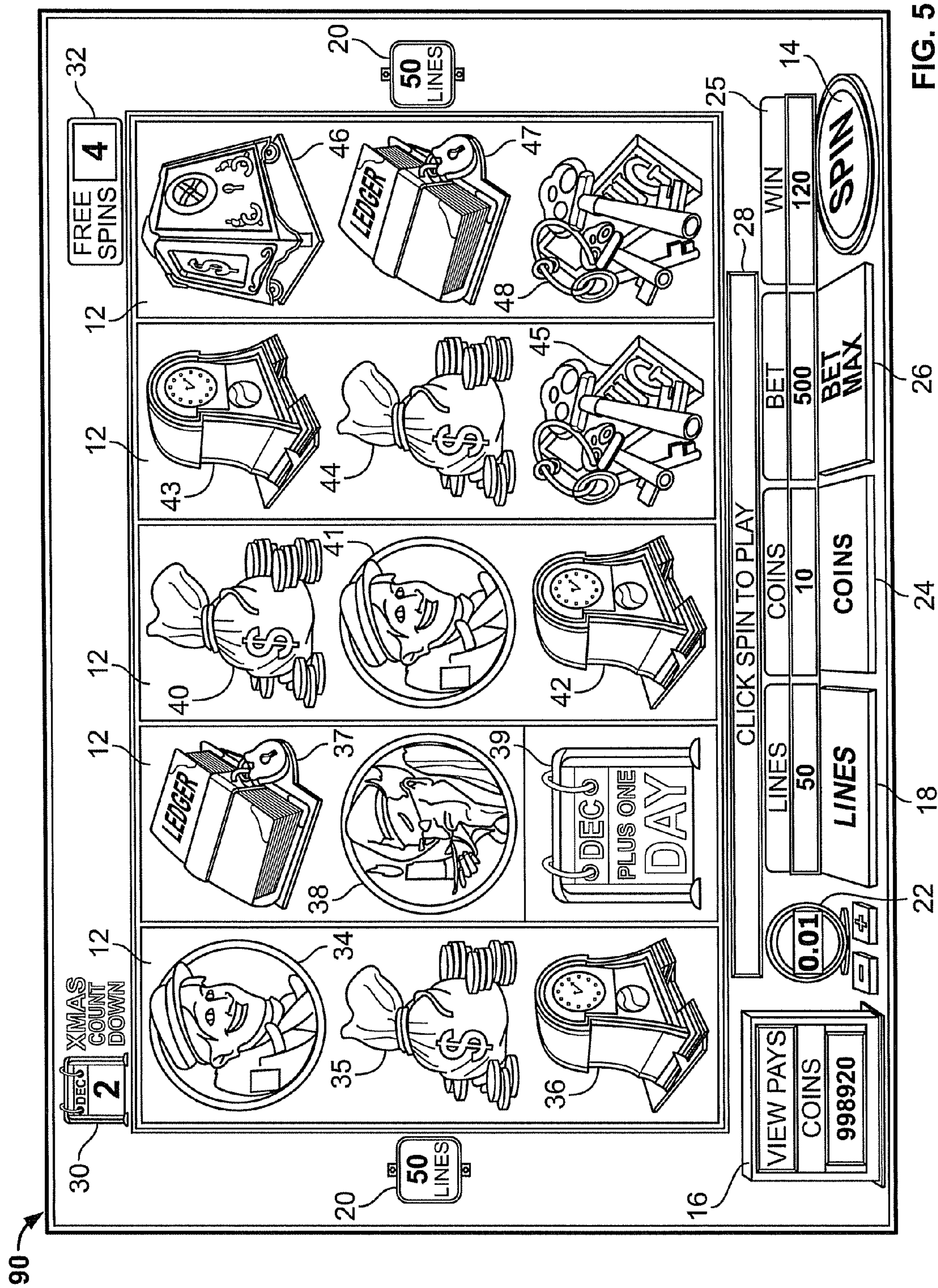

Next, FIG. 5 illustrates an example image 90 that may be visually presented on a display in accordance with an example embodiment. A display may present image 90 for the winning wager, represented in FIG. 4, after the event symbol at symbol location 39 is selected via a symbol selector. In FIG. 5, the symbol at symbol location 39 has been replaced with a prize symbol that indicates the user has won a bonus prize to change the Christmas count-down calendar by one day. As a result of changing-a-date-of-the-count-down-calendar, counter display 32 indicates that the XMAS countdown is at December $2^{nd}$. Since an event symbol on the winning pay-line has been selected, user prompt 71 no longer displays the message "CLICK A WINNING SYMBOL OF YOUR CHOICE." Additionally, user message display 28 may display "CLICK SPIN TO PLAY" so as to prompt the user to initiate the next occurrence of the video multi-reel slot event.

Another example video event in accordance with the example embodiments is the video playing card event. A video playing card event may be carried out on a stand-alone video device, a server, or a client device that functions in cooperation with a server. A video playing card event may comprise any of a variety of video playing card events, such as solitaire, poker, black jack, or some other video playing card event. Each of the video playing card events may be carried out using one or more decks of playing cards simulated by a computing system. Each deck of playing cards comprises a given number of cards (e.g., 52 cards). Each of the playing cards comprises a front side that distinguishes it from the other cards in the deck, and a back side that is substantially identical to the back sides of the other cards in the deck.

For the example video playing card events, the display is operable to display event symbols that represent the front side or the back side of the playing cards dealt from the deck of cards. The event symbols displayed on the display may be arranged in one or more distinct sets of cards referred to as a user's hand, a dealer's hand, or an opponent's hand.

Upon determining that a wager placed on a video playing card event is a winning wager, a main prize, such as a number of coins, may be awarded, and the event symbols representing cards in the user's hand may be identified as event symbols that may be selected via a symbol selector. Similar to the video multi-reel slot events, upon selecting an event symbol that represents a playing card in the user's hand, the selected event symbol may be replaced with a prize symbol that reveals a bonus prize won for the winning wager placed on the video playing card event. The bonus prize won for the video playing card event may comprise changing-a-date-of-the-count-down-calendar, such as the previously described Christmas count-down calendar, changing-a-time-on-a-count-down-timer to launch a rocket ship, a free deal of the video playing card event, or some other bonus prize. The bonus prizes won during a video event session of the video playing card events may be tracked in bonus prize counters, such as counter 1106, 1108.

3. Example Architecture

The example video events disclosed in this description may be carried out by any of a variety of devices. In one respect, a device that carries out one or more of the example video events may comprise a client device that functions in cooperation with a server. The video events carried out by the client device may be facilitated through the interconnection of a communication network to the client device and the server. In another respect, a device that carries out one or more of the example video events may comprise a stand-alone video device that comprises elements that allow the video device to carry out the video events without connecting to a server or a client device. In yet another respect, a device that carries out one or more of the example video events may comprise a server that also facilitates carrying out video events at one or more client devices.

Figure 6:
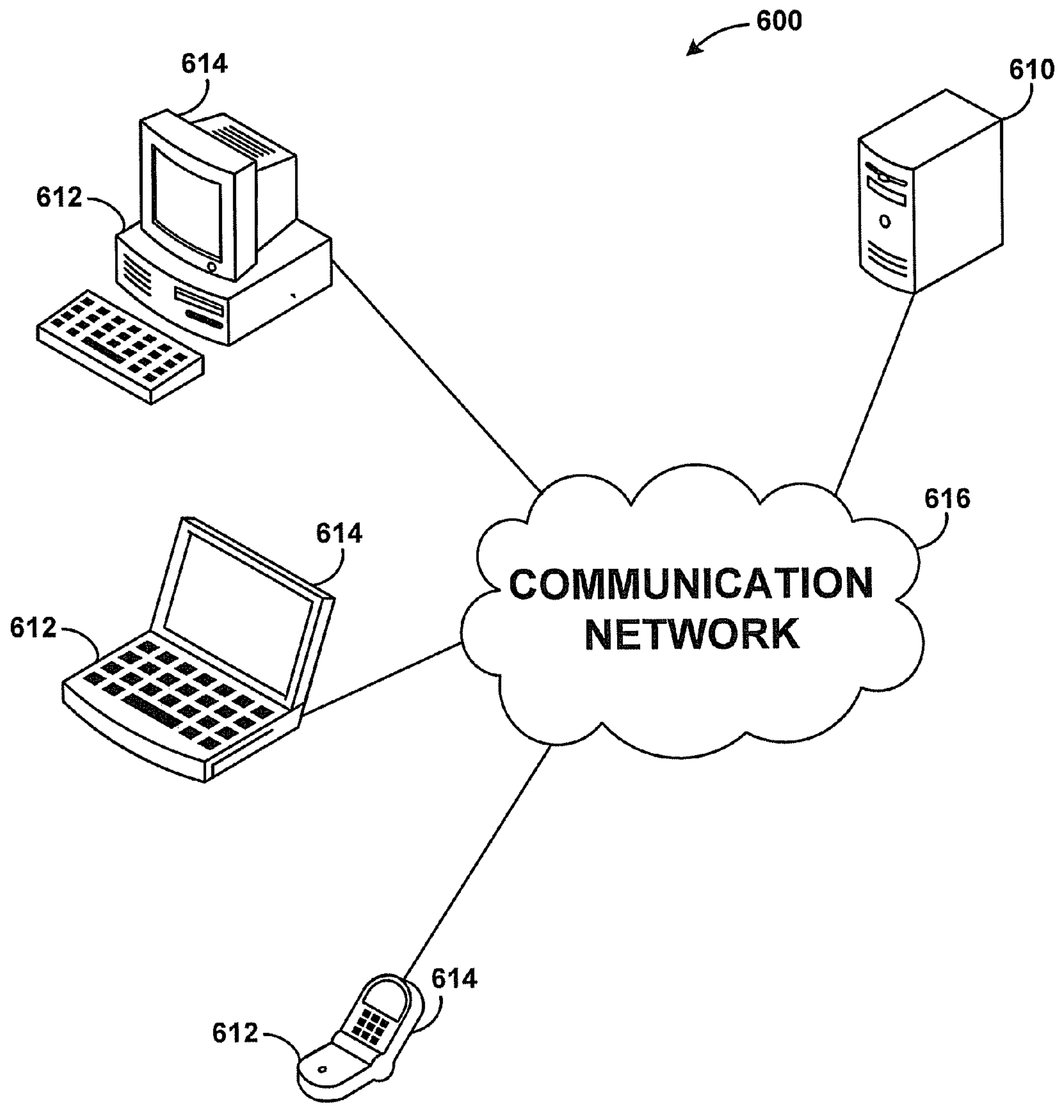
FIG. 6 is a diagram of a client/server networked computing system that may be used to facilitate carrying out computerized video events in accordance with the example embodiments.

FIG. 6 depicts an example arrangement for playing the example video events. It should be understood, however, that this and other arrangements and processes described herein are set forth for purposes of example only, and other arrangements and elements (e.g., devices, interfaces, functions, orders of elements, etc.) may be added or used instead, and some elements may be omitted altogether. Further, as in most computer and communication architectures, those skilled in the art will appreciate that many of the elements described herein are functional entities that may be implemented as discrete components or in conjunction with other components, in any suitable combination and location. Further still, various functions described herein as being performed by one or more elements may be carried out by hardware, firmware, software (e.g., computer-readable program instructions that are stored at a data storage device and executable by a processor), or some combination of hardware, firmware, and software.

In FIG. 6, a system 600 includes a server 610, client devices 612, and a communication network 616. Server 610 and client devices 612 may be capable of communicating with each other by means of communication network 616. Communication network 616 may be a public Internet Protocol (IP) network such as the Internet, a private IP network, or a public or a private network that operates according to some other communication protocol(s). Client devices 612 may be, for example, desktop computers, laptops, or wireless communication devices such as cell phones.

A display 614 is preferably associated with each client device 612. For purposes of this description, a display that is associated with a device refers to a display that is operable to visually present images for a video event being carried out by or for that device. A display associated with a device may be integrated with the device as a combined device and display (e.g., the display of a cellular telephone or a laptop computer), or the display may be coupled to the device via a wired or wireless link (e.g., a display connected to a desktop computer via a wired cable).

Furthermore, communication network 616 may be a purpose-built or hardcoded network designed for the support of networked video events. For example, server 610 may be a mainframe computer and client devices 612 may be terminals that only communicate with server 610. Thus, communication network 616 may only comprise communication links between the devices they connect.

Client devices 612 and server 610 may include various computing technologies, such as those that are semiconductor-based, magnetic, optical, acoustic, or biological in nature, any combination of these computing technologies, or any other technology known today or developed in the future, that may be used in conjunction with computational devices. A networked video event architecture may also be defined to comprise more or fewer elements. For example, server 610 may be distributed across more than one physical or logical device.

A. Servers

Server 610 may comprise a computing device with input, output, processing, storage, and memory functions. Server 610 may be a form of personal computer, or may be physically designed for server operation. For example, server 610 may be a rack-mounted or blade server component. With respect to the depiction of server 610 in FIG. 6, server 610 may actually take the form of multiple physical components or computers that are co-located or distributed. For example, server 610 may be a cluster of computing devices that operate in conjunction with one another to enable networked video events. This cluster may be in a particular physical location, such as an Internet service provider (ISP), or may operate over a network between multiple physical locations.

Server 610 may run a standalone or distributed operating system to enable server functions. This operating system may be based on Microsoft Windows, Apple's MacOS, Linux, FreeBSD or various other technologies. These operating systems preferably support multiple processes or threads of execution so that a single server 610 may support a potentially large number of video events simultaneously. Additionally, server 610 may be provisioned with a network connection.

Server 610 preferably operates under control of a server-stored program (not shown) capable of enabling client devices 612 to participate in one or more video events. The stored program in server 610 may also maintain a dynamic register of all users admitted to, and actively participating in, a video event, together with data representative of the corresponding video event.

Additionally, server 610 may contain, or have access to, accounts associated with each of these users. Thus, server 610 may add credits to or debit credits from these accounts in accordance with the networked video event being carried out. Furthermore, server 610 may have an interface from which a given user may access his or her account in order to add more credits, or to cash out the account's credit balance (e.g., a coin balance 1110 shown in FIG. 11). Moreover, server 610 may also have an administrative interface, from which an administrator of server 610 may add, delete, or modify accounts or video event settings.

B. Client Devices

Client devices 612 may comprise personal computers, computer terminals, laptop computers, wireless communication devices such as cell phones, personal digital assistants, or similar devices. Furthermore, client devices 612 may operate under an operating system such as Microsoft Windows, Apple MacOS, Linux or FreeBSD, and are preferably provisioned with a web browser and network connection.

Using a client device 612, networked video events may be facilitated by a client process (not shown) that executes on client device 612, and a server-stored program (not shown), or server process, that executes on server 610. In order to carry out a networked video event from any client device 612, a client process may first be downloaded, for example, from server 610 to client device 612. The downloaded client process may then be installed at client device 612, such that the client process is ready for execution. Alternatively, the client process may execute from within a World Wide Web browser of client device 612. In either case, once the client process is launched, communication between client device 612 and server 610 may then proceed.

The output functions of client devices 612 may comprise a graphical user interface (GUI) rendered on display 614. Such a GUI may represent networked video event information in some combination of graphics and text. For example, a GUI on display 614 may represent the state of a video multi-reel slot event or video playing card event being carried out via client device 612, and include options to perform the acts of carrying out the video event, and, during the course of the video event, accepting or rejecting offers to spin the reels, or deal, replace, or discard playing cards in a user's hand. Images 10, 70, 80, 85, and 90 are example images that may be displayed on display 614.

C. Stand-alone Video Device

Figure 7:
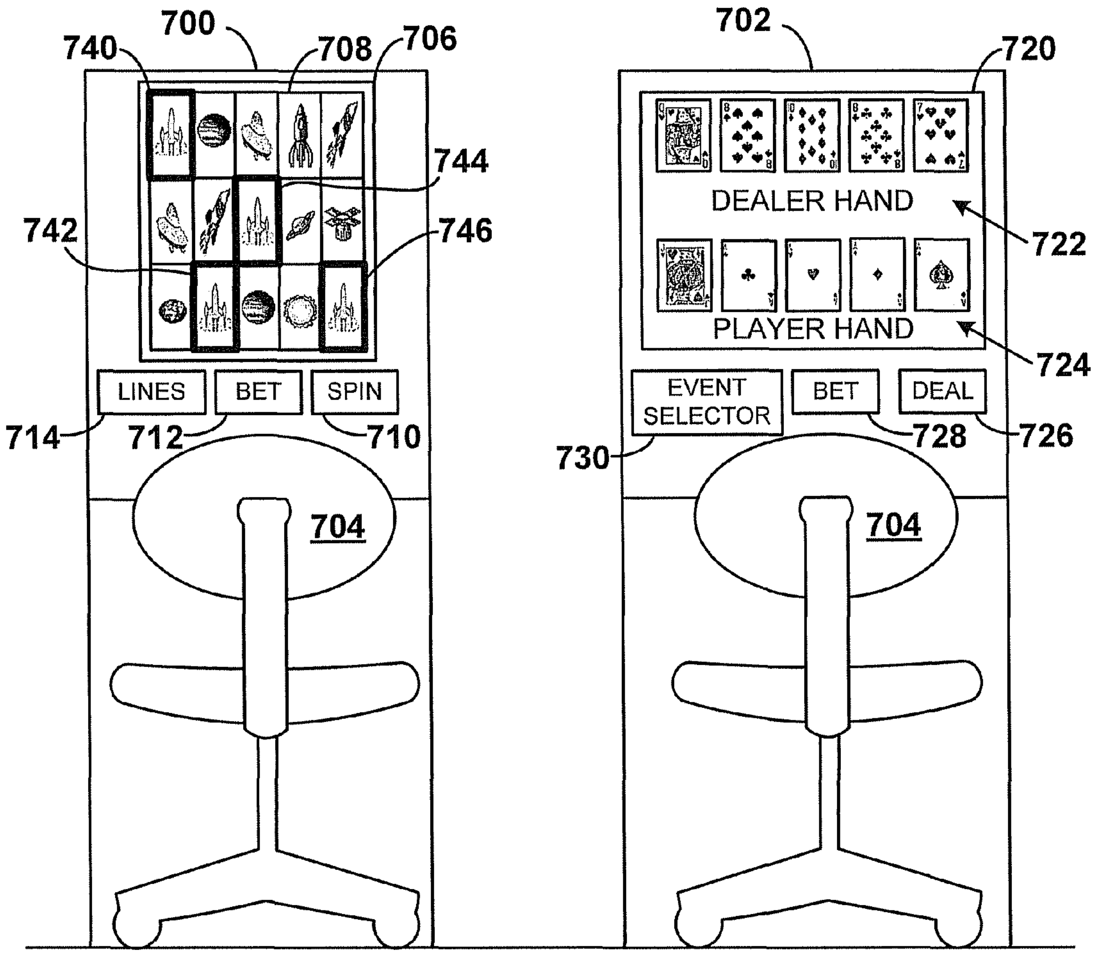
FIG. 7 is a diagram of stand-alone video devices that are operable to carry out example video events described herein.

FIG. 7 is a diagram of stand-alone video devices 700, 702. Elements of server 610 and elements of a client device 612 may be combined to form a stand-alone video device, such as video device 700 or 702. Stand-alone video devices may be connected to a communications network, such as communications network 616. However, stand-alone video devices 700, 702 are operable to carry out video events, such as the example video events described in this description, without communicating via the communication network to determine the outcomes of wagers placed on the video events.

Video devices 700, 702 may be located at a location where on-site wagering occurs, such as a land-based casino, river-boat casino, tavern, restaurant, hotel, or some other location. A respective seat 704 may be positioned near video devices for user comfort.

Video device 700 comprises a display 706 that is operable to display a symbol array 708 having M rows and N columns, where M=3 and N=5. An event symbol is displayed in each row of each column, and the event symbols comprise images having a space-travel theme. Video device 700 may include a variety of user controls so as to carry out video events and to place wagers on the video events at video device 700. The user controls may include a video event trigger 710, a bet selector 712, and a pay-line selector 714.

The symbol array 708 is illustrated as including a winning pay-line. The winning pay-line includes the event symbols surrounded by the symbol frames 740, 742, 744, and 746, although a variety of other pay-lines may be defined for video events carried out at video device 702. Video device 702 may include a symbol selector that is operable to receive a selection of an event symbol on the winning pay-line. Upon selecting an event symbol on the winning pay-line, the selected event symbol may be replaced with a prize symbol that identifies a bonus prize for a winning wager. The other event symbols on the winning pay-line, as well as the displayed event symbols not on the winning pay-line, may continue to be displayed while the prize symbol is displayed. The prize symbol and event symbols displayed with the prize symbol may be displayed until a next video event at video device 700 is initiated.

A variety of bonus prizes may be awarded each time a winning wager is placed on a video event carried out at video device 700. As an example, the bonus prize may comprise the changing-a-time-on-a-count-down-timer to launch a rocket ship, as previously described, or a free spin of the multi-reel video event that may be carried out at video device 700. Other examples of bonus prizes awarded by video device 700 are also possible.

Video device 702 comprises a video playing card event that includes a display 720. Any of a variety of video playing card events may be carried out at video device 702, such as those listed above. Video device 702 may include any of a variety of user controls so as to carry out video events at video device 702. The user controls may include a video event trigger 726, a bet selector 728, a video event selector 730, and/or some other user control. Display 720 is operable to display multiple hands of playing cards dealt from one or more simulated decks of cards. As shown in FIG. 7, display 720 displays a dealer hand 722 including five playing cards and a user hand 724 including five playing cards. Each of the cards in display 720 represents an event symbol.

When a user hand 724 is determined to be a winning hand (i.e., a user hand of playing cards that wins a wager) a main prize may be awarded. The main prize may be a quantity of coins, such as quantity of coins equal to twice the quantity of coins wagered. A user prompt (not shown) may prompt a user to select an event symbol of user hand 724 so as to reveal a bonus prize associated with the selected event symbol. The bonus prizes winnable for winning the video event may comprise changing-a-date-of-the-count-down-calendar, changing-a-time-on-a-count-down-timer, a free deal of the video playing card event, or some other bonus prize.

D. Functional Model of Server, Client, and Stand-alone Video Devices

Figure 8:
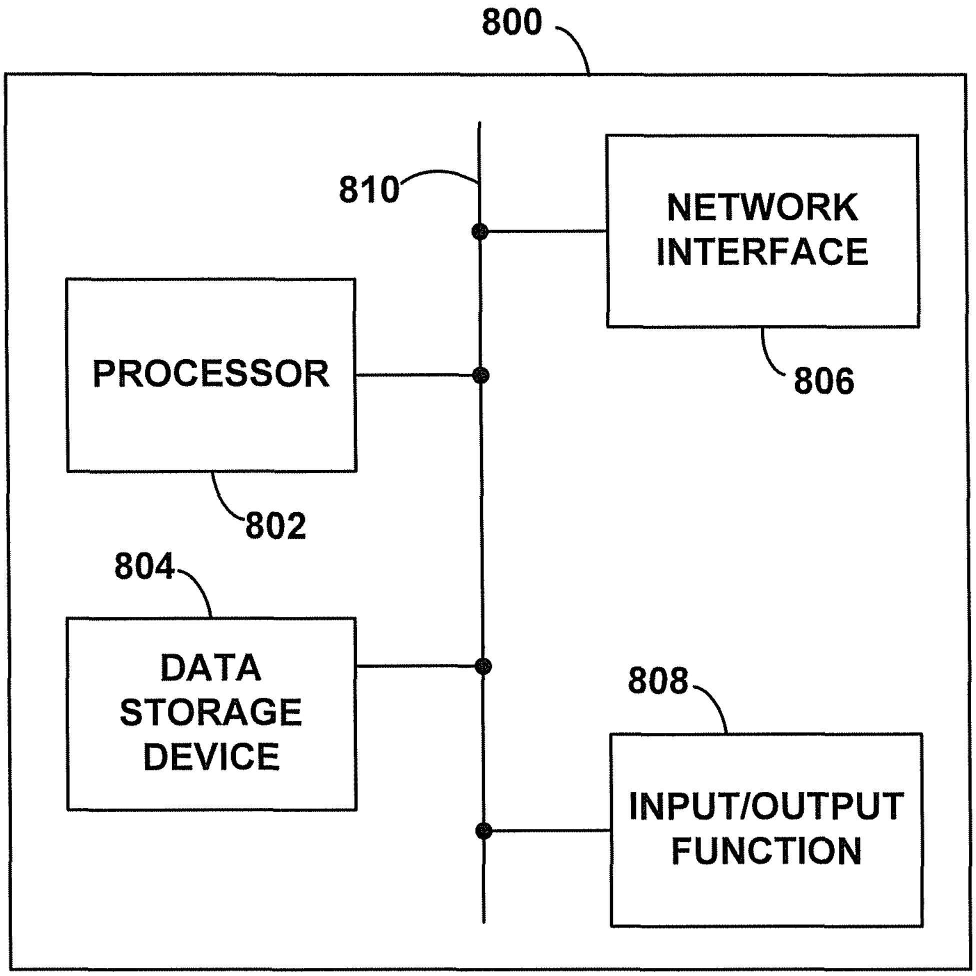
FIG. 8 is a block diagram of an example computing device that is operable to execute part or all of the example video events described herein.

FIG. 8 is a simplified block diagram depicting an example computing device 800. Servers, such as server 610, client devices, such as client device 612, and stand-alone video devices, such as video devices 700, 702, may be arranged as computing device 800. FIG. 8 illustrates some of the functional components that would likely be found in a computing device that operates in accordance with the embodiments described herein. Computing device 800 preferably includes a processor 802, a data storage device 804, a network interface 806, and an input/output function 808, all of which may be coupled by a system bus 810 or a similar mechanism.

Processor 802 preferably includes one or more central processing units (CPUs), such as one or more general purpose processors and/or one or more dedicated processors (e.g., application specific integrated circuits (ASICs) or digital signal processors (DSPs), etc.) Data storage device 804 may comprise volatile and/or non-volatile memory and may be integrated in whole or in part with processor 802. Alternatively, part or all of data storage device 804 may be external to computing device 800, and thus may take the form of a remote storage device or a network storage device. Data storage device 804 preferably contains computer-readable program instructions executable by processor 802, and data that is manipulated by these instructions, to carry out various functions described herein. Alternatively, the functions may be carried out by hardware, firmware, and/or any combination of hardware, firmware and software.

In general, data storage device 804 contains data associated with performing any of the methods, processes, or functions described herein or represented by any of the accompanying figures. In particular, as shown in FIG. 11, data storage device 804 may contain program instructions 1100, event symbol data 1102, prize symbol data 1104, and user account data 1112 including bonus prize counters 1106, 1108, wager data 1109, and coin balance data 1110.

Program instructions 1100 may comprise computer-readable program instructions that are executable by processor 802 to perform any of the server or client device methods, processes, or functions presented herein or represented by any of the accompanying figures.

Event symbol data 1102 may comprise data that is used to identify, retrieve, and generate multiple event symbols on a display for an example video event. Table 1 provides an example of event symbol data 1102 including an event symbol identifier (ID) column, a data address column, an image column, and an example column. Table 1 identifies eleven event symbols that have a respective event symbol ID GS01 through GS11. Each data address in the data address column identifies an example address of data storage device 804 at which the image defined by that row may be stored. The image column provides a description of the different event symbols shown in FIGS. 1 through 5, and the example column identifies symbol positions where an example of each of the different event symbols is located.

TABLE 1

| EVENT SYMBOL ID | DATA ADDRESS | IMAGE | EXAMPLE |
|---|---|---|---|
| GS01 | 1000000-1001FFF | Clock | Symbol position 34 in FIG. 1 |
| GS02 | 1002000-1002FFF | Ghoul | Symbol position 37 in FIG. 1 |

TABLE 1-continued

| EVENT SYMBOL ID | DATA ADDRESS | IMAGE | EXAMPLE |
|---|---|---|---|
| GS03 | 1003000-1003FFF | Money bag | Symbol position 40 in FIG. 1 |
| GS04 | 1004000-1004FFF | Keys | Symbol position 46 in FIG. 1 |
| GS05 | 1005000-1005FFF | Safe | Symbol position 35 in FIG. 1 |
| GS06 | 1006000-1006FFF | Man with beard | Symbol position 38 in FIG. 1 |
| GS07 | 1007000-1007FFF | Man with hat | Symbol position 41 in FIG. 1 |
| GS08 | 1008000-1008FFF | Man with candle | Symbol position 47 in FIG. 1 |
| GS09 | 1009000-1009FFF | Main with chain | Symbol position 39 in FIG. 1 |
| GS10 | 100A000-100AFFF | Ledger | Symbol position 48 in FIG. 1 |
| GS11 | 100B000-100BFFF | Man pointing up | Symbol position 48 in FIG. 2 |

Prize symbol data 1104 may comprise data that is used to identify, retrieve, and generate multiple prize symbols so as to reveal bonus prizes awarded for a winning wager placed on an example video event. Table 2 provides an example of prize symbol data 1104 including a prize symbol identifier (ID) column, a data address column, an image column, and an example column. Table 2 identifies two prize symbols that have a respective prize symbol PS01 and PS02. Each data address in the data address column identifies an example address of data storage device 804 at which the image defined by that row may be stored. The image column provides a description of each of the prize symbols shown in FIGS. 3 and 5, and the example column identifies symbol positions where the different prize symbols shown in FIGS. 3 and 5 are located.

TABLE 2

| PRIZE SYMBOL ID | DATA ADDRESS | IMAGE | EXAMPLE |
|---|---|---|---|
| PS01 | 1010000-1010FFF | Free spin | Symbol position 41 in FIG. 3 |
| PS02 | 1011000-1011FFF | Calendar | Symbol position 39 in FIG. 5 |

Coin balance data 1110 may indicate the quantity of coins in a user's account. Coin balance data may be changed for any of a variety of reasons, such as placing a wager, winning a wager, changing the value of each coin, beginning a video event session, ending a video event session to receive a payout of the coins, or some other reason.

Bonus prize counters 1106, 1108 are operable to track bonus prizes awarded as a result of playing the example video events described herein, and in particular, for winning a wager placed on an example video event. For any of the example video events, bonus prize counter 1106 may comprise a calendar date counter in which data in the counter represents a given date on a Julian calendar. For instance, the bonus prize counter 1106 may track dates on the Christmas countdown calendar between December $1^{st}$ and December $25^{th}$. In accordance with this example, valid values for bonus prize counter 1106 may be 1 through 25, where each valid value represents a given date for the first 25 days of December. For instance, a value of 1 represents December $1^{st}$, a value of 2 represents December $2^{nd}$, and a value of 25 represents December $25^{th}$.

For the video multi-reel slot events, bonus prize counter 1108 may comprise a counter that tracks how many bonus prizes in the form of free spins of the video multi-reel slot event have been won by a user and not yet redeemed. Bonus prize counter 1108 may be incremented by a value of 1 each time a free spin bonus prize is won and decremented by a value of 1 each time a free spin bonus prize is redeemed.

For a video playing card event, bonus prize counter 1108 may comprise a counter that tracks how many bonus prizes in the form of free deals of a video playing card event have been won by the user and not yet redeemed. Bonus prize counter 1108 may be incremented by a value of 1 each time a free deal bonus prize is won and decremented by a value of 1 each time a free deal bonus prize is redeemed.

Furthermore, the devices carrying out the example video events may use a bonus prize counter, such as bonus prize counter 1106, to determine whether to allow a user to redeem bonus prizes being tracked in bonus prize counter 1108. For example, the devices that carry out the example video events may restrict a user from redeeming the free spin or free deal bonus prizes being tracked in bonus prize counter 1108 until bonus prize counter 1106 equals a value of 25 (e.g., a value used to represent that the first 25 days of December have been counted). In accordance with this example, 25 is the threshold value that must be obtained before the bonus prizes being tracked by bonus prize counter 1108 may be redeemed.

Wager data 1109 may comprise data pertaining to wagers placed by a user. In one respect, wager data 1109 may comprise data that indicates the amount of a wager placed on a video event when a bonus prize being tracked by bonus prize counter 1108 was won. The middle column of Table 3 identifies the amount of a wager placed when the bonus prize counter 1108 was incremented to the value shown in the left-most column of Table 3. The values in the middle column of Table 3 may be used to determine the amount of a wager (e.g., a quantity of coins) to be used when a free spin or free deal bonus prize is redeemed. For instance, if a free spin is being redeemed when bonus prize counter 1108 equals 17, then the amount of the wager for the free spin is 100 coins.

In another respect, wager data 1109 may comprise data that indicates an average wager. The right-most column of Table 3 indicates the average amount of winning wagers placed on video events when a bonus prize being tracked by bonus prize counter 1108 are won. Although Table 3 shows 17 values in the right-most column, the wager data 1109 may only include one value that represents the most-recently determined average wager. When a user begins redeeming prizes being tracked by bonus prize counter 1108, the average wager identified in wager data 1109 may be used to determine the amount of a wager (e.g., a quantity of coins) to be used when a free spin or free deal bonus prize is redeemed. For instance, if the average wager is 126 coins, as shown in the bottom row of Table 3, then when a user begins to redeem the 17 bonus prizes (e.g., free spins or free deals), the user is provided with 126 coins for each free spin or free deal. In an alternative arrangement, the wager data 1109 may comprise data that indicates the average wager for both winning and losing wagers placed on video events carried out during a given video event session.

TABLE 3

| Bonus prize counter 1108 | Wager Data 1109 (in coins) | Wager Data 1109 (Average) (in coins) |
|---|---|---|
| 1 | 50 | 50 |
| 2 | 50 | 50 |
| 3 | 50 | 50 |
| 4 | 50 | 50 |
| 5 | 100 | 60 |
| 6 | 100 | 67 |
| 7 | 100 | 71 |
| 8 | 100 | 75 |
| 9 | 50 | 72 |
| 10 | 50 | 70 |
| 11 | 500 | 109 |
| 12 | 500 | 142 |
| 13 | 125 | 140 |
| 14 | 125 | 139 |
| 15 | 50 | 133 |
| 16 | 50 | 128 |
| 17 | 100 | 126 |

Returning to FIG. 8, network interface 806 may take the form of a wireline connection, such as an Ethernet, Token Ring, SONET, or T-carrier connection. Network interface 806 may alternatively or additionally take the form of a wireless connection, such as IEEE 802.11, BLUETOOTH®, CDMA, WIMAX®, UMTS®, LTE®, or any other interface used to communicate. However, other forms of physical layer connections and other types of standard or proprietary communication protocols may be used over network interface 806. Furthermore, network interface 806 may comprise multiple physical or logical network interfaces, each capable of operating according to the same or different protocols.

Input/output function 808 facilitates user interaction with computing device 800. Input/output function 808 may comprise multiple types of input devices, such as a keyboard, a mouse, a touch screen, and so on. Input/output function 808 may include the symbol selector used to select an event symbol so as display a prize symbol that reveals a bonus prize. Input/output function 808 may also comprise multiple types of output devices, such as a display, monitor, printer, or one or more light emitting diodes (LEDs). Additionally or alternatively, computing device 800 may support remote access from another device, via network interface 806 or via another interface (not shown), such an RS-232 port.

3. Example Operation

Figure 9:
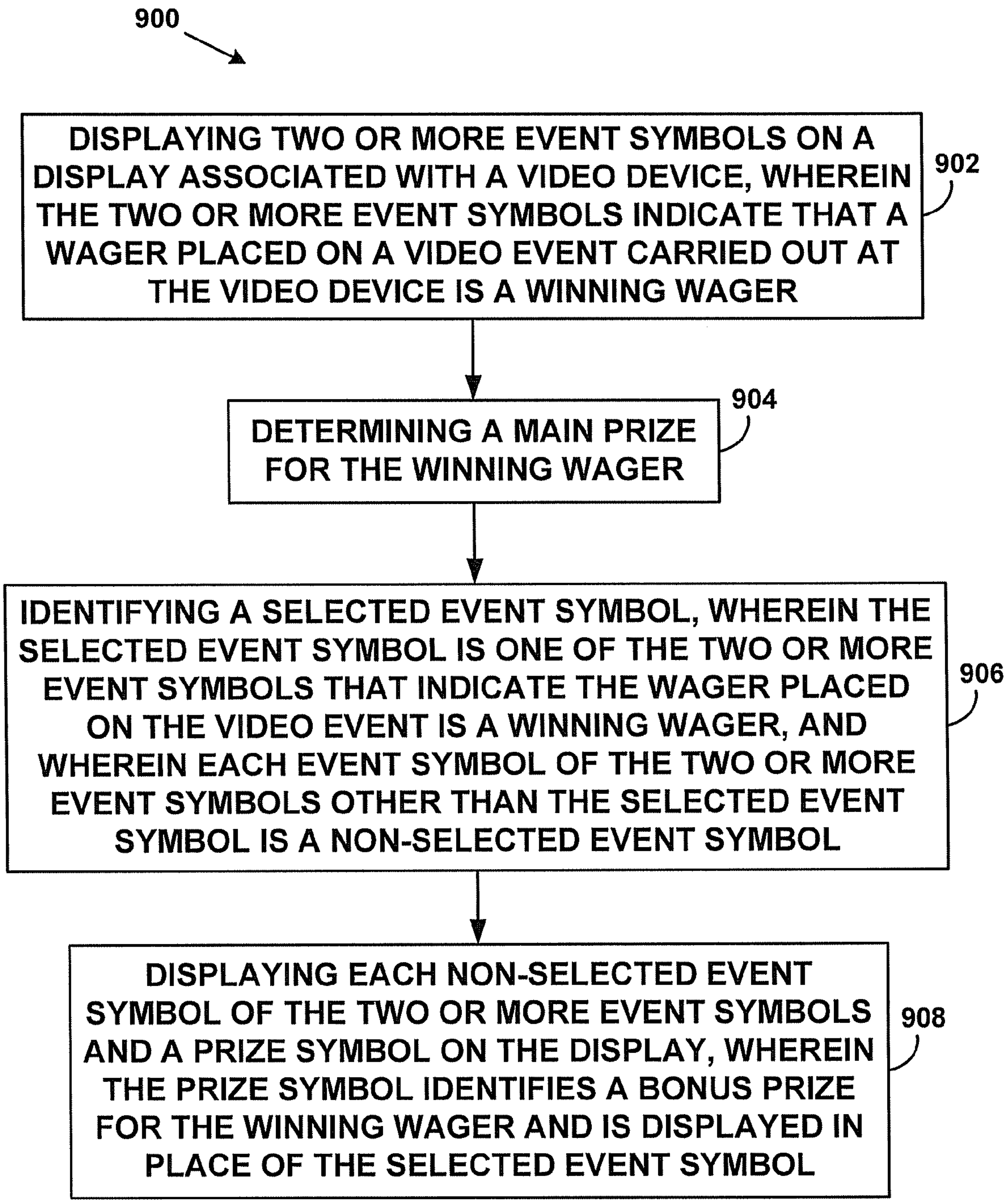
FIG. 9 and FIG. 10 are flow diagrams depicting sets of functions that may be carried out in accordance with example embodiments.

Next, FIG. 9 is a flow chart 900 provided to illustrate a set of functions that may be carried out in accordance with an example embodiment. The set of functions identified by flow chart 900 may be carried out by (i) a stand-alone video device, such as video device 700 or 702, (ii) a server, such as server 610, and (iii) a client device, such as one of client devices 612, alone or in combination with server 610.

Block 902 includes displaying two or more event symbols on a display associated with a video device, wherein the two or more event symbols indicate that a wager placed on a video event carried out at the video device is a winning wager. For a multi-reel slot video event, the two or more event symbols may comprise event symbols on a winning pay-line, and the two or more event symbols may be distinguished from event symbols that are not on the winning pay-line. As an example, symbol frames such as symbol frames 72, 74, 76, and 78, may be used to distinguish the event symbols on the winning pay-line from event symbols that are not on the winning pay-line (i.e., event symbols not surrounded by a symbol frames). As another example, backlighting or a higher intensity backlighting may be used to distinguish event symbols on the winning pay-line from event symbols that are not on the winning pay-line (i.e., event symbols that are not backlit or backlit with lower intensity backlighting).

For a video playing card event, the two or more event symbols may comprise event symbols that represent playing cards in a winning hand dealt from a simulated deck of playing cards. Event symbols in the winning hand of cards may be identified using symbol frames, backlighting or some other means.

Next, block 904 includes determining a main prize for the winning wager. The main prize may be based on a variety of factors. For a video multi-reel slot event, the main prize may be based on the wager placed, which pay-line(s) is/are winning pay-line(s), and the arrangement of event symbols on each of the winning pay-line(s). For a video playing card event, the main prize may be based on the wager placed. Alternatively, the main prize for the video playing card event may be based on the wager placed and the cards displayed for the user's hand and/or the cards displayed for the dealer's hand. Program instructions contained within program instructions 1100 may be executable to determine the main prize for the winning wager. These program instructions may be executable by processor 802 at the stand-alone video device, a client-device 612, or server 610.

Next, block 906 includes identifying a selected event symbol, wherein the selected event symbol is one of the two or more event symbols that indicate the wager placed on the video event is a winning wager, and wherein each event symbol of the two or more event symbols other than the selected event symbol is a non-selected event symbol. Identifying the selected event symbol may be carried out using a symbol selector to select the event symbol. Identifying the selected event symbol may also include transmitting a message that identifies the event symbol selected via the symbol selector. Transmission of this message may occur via system bus 810 and/or communication network 616.

Next, block 908 includes displaying each non-selected event symbol of the two or more event symbols and a prize symbol on the display, wherein the prize symbol identifies a bonus prize for the winning wager and is displayed in place of the selected event symbol. While the prize symbol is being displayed, a counter display associated with the bonus prize may be updated to reflect that the bonus prize has been won.

Figure 10:
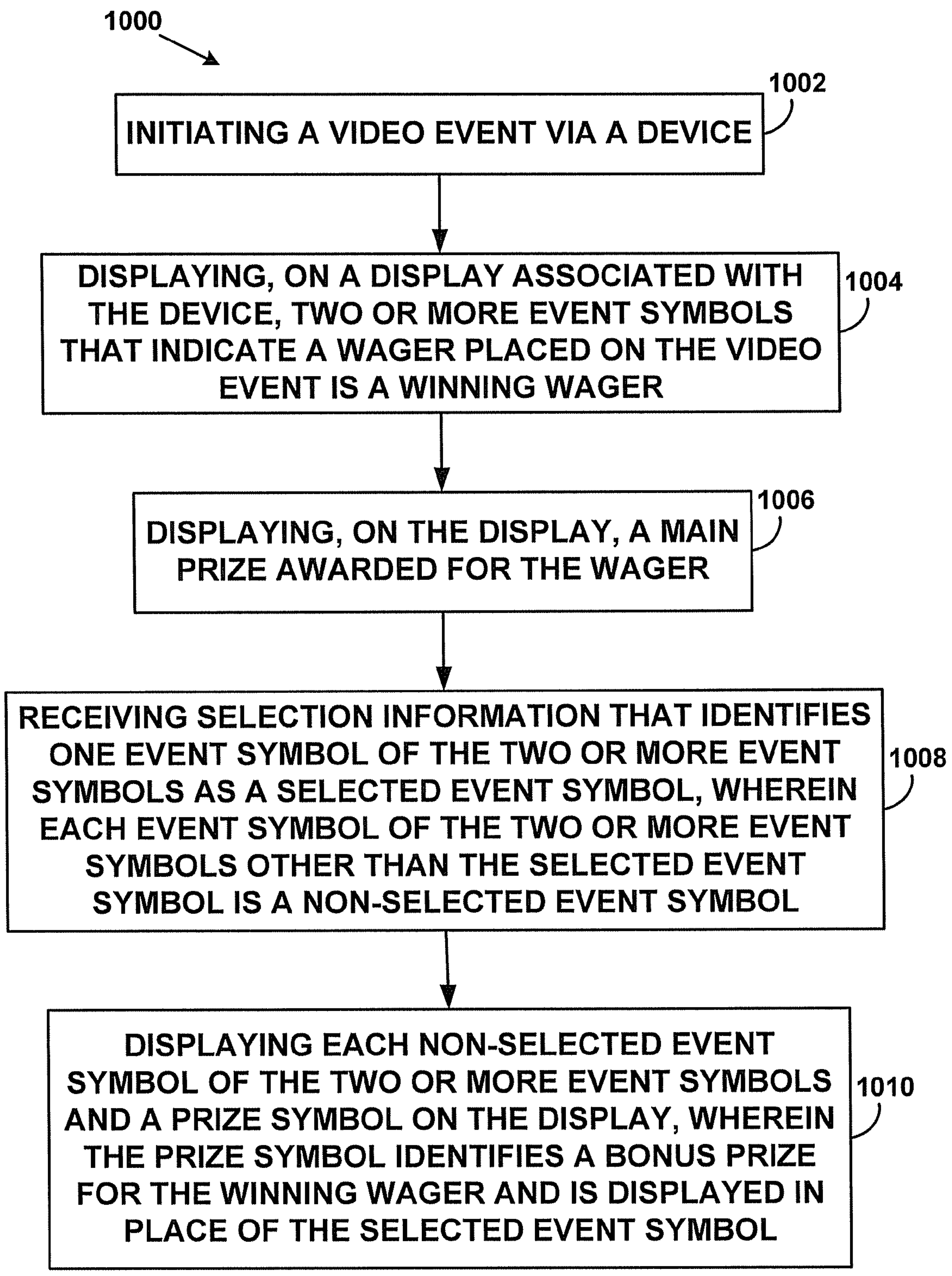

Next, FIG. 10 is a flow chart 1000 provided to illustrate another set of functions that may be carried out in accordance with an example embodiment. The set of functions identified by flow chart 1000 may be carried out by (i) a stand-alone video device, such as video device 700 or 702, (ii) a server, such as server 610, and (iii) a client device, such as one of client devices 612, alone or in combination with server 610.

Block 1002 includes initiating a video event via a device. Initiating the video event may occur in response to engagement of a video event trigger, such as video event trigger 14, 710, or 726. Processor 802 may detect engagement of the video event trigger and execute program instructions to initiate the video event. If the video event is initiated via a client device 612, the client device 612 may transmit a message to server 610 via communication network 616 so as to notify server 610 that a new video event has been initiated. The video event initiated at block 1002 may comprise any of a variety of video events, such as a multi-reel slot video event or a video playing card event.

Next, block 1004 includes displaying on a display associated with the device two or more event symbols that indicate a wager placed on the video event is a winning wager. The event symbols for the winning wager may comprise event symbols on a reel, such as the event symbols surrounded by symbol frames 72, 74, 76, 78. Alternatively, the event symbols may comprise event symbols that represent playing cards in a winning hand dealt from a simulated deck of playing cards. Other examples of the event symbols that indicate a wager placed on the video event is a winning wager are also possible.

Next, block 1006 includes displaying, on the display, a main prize awarded for the winning wager. Processor 802 may determine the main prize (e.g., a first number of coins) and add the main prize (e.g., a second number of coins) to a current user account balance. Processor 802 may cause the display to visually present the updated user account balance (e.g., a third number of coins) that equals the sum of the first number of coins plus the second number of coins. The user account balance may be tracked via coin balance data 1110.

Next, block 1008 includes receiving selection information that identifies one event symbol of the two or more event symbols as a selected event symbol, wherein each event symbol of the two or more event symbols other than the selected event symbol is a non-selected event symbol. The selected event symbol may be selected via the example symbol selector described herein. The selection information may be received at processor 802 via system bus 810. For a stand-alone video device, input/output function 808 may provide the selection information to system bus 810. For a client device or a server, network interface 806 may provide the selection information to system bus 810 after network interface 806 receives the system information via communication network 616.

Next, block 1010 includes displaying each non-selected event symbol of the two or more event symbols and a prize symbol on the display, wherein the prize symbol identifies a bonus prize for the winning wager and is displayed in place of the selected event symbol. Processor 802 may determine the bonus prize and cause the display to replace the selected event symbol being displayed on the display, such as the event symbol at symbol position 41 in FIG. 3, with the prize symbol at symbol position 41, as shown in FIG. 4.

Figure 12:
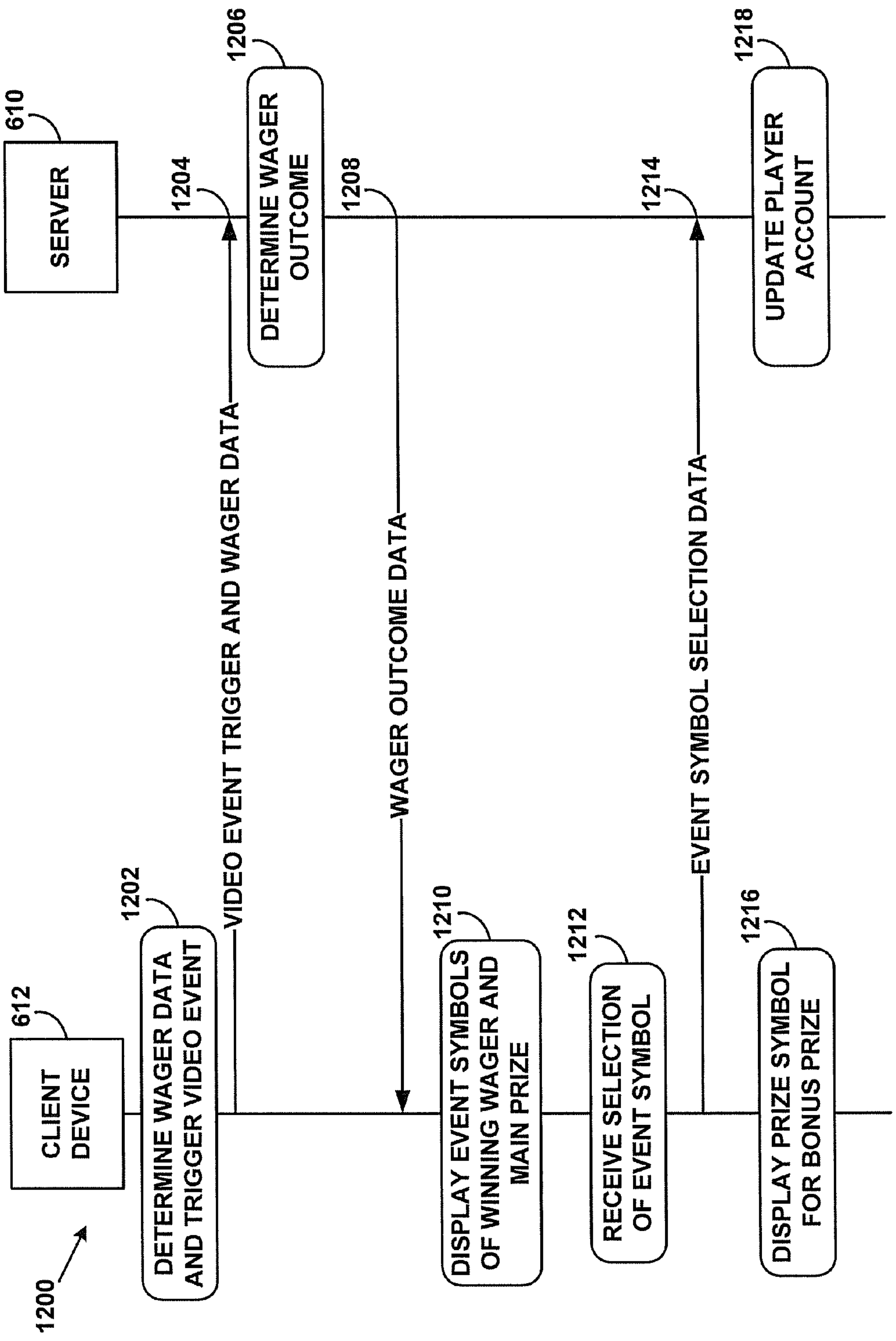
FIG. 12 is a diagram depicting an example message flow between a server and a client device.

Next, FIG. 12 depicts a message flow 1200 between server 610 and client device 612 that may be carried out to facilitate a winning wager placed on a video event. The video event may comprise a video multi-reel slot event, a video playing card event, or some other video event. The lines that extend between the server side of FIG. 12 and the client device side of FIG. 12 represent communications (e.g., messages and/or data) that may be communicated via communication network 616. The functions of blocks 1202, 1210, 1212, and 1216 are carried out at client device 612, whereas the functions of blocks 1206 and 1218 are carried out by server 610.

At block 1202, client device 612 determines wager data and triggers a video event. As an example, the wager data may be based on data entered via pay-line selector 18, coin value selector 24, and maximum bet selector 26 so as to place a wager on a video event. Client device 612 may trigger the video event in response to engagement of a video event trigger, such as video event trigger 14. At line 1204, client device 612 provides server 610 with the wager data determined at block 1202 and notifies server 610 that a next occurrence of the video event has been triggered. For a multi-reel slot video event, triggering the video event may cause reels 12 to begin spinning. For a video playing card event, triggering the video event may cause user and dealer hands to be dealt from a simulated deck of playing cards.

At block 1206, server 610 determines an outcome of a wager placed on the video event. At line 1208, server 610 provides client device 610 with wager outcome data. The wager outcome data may include data that identifies which event symbols are to be displayed on a display associated with client device 612 and data that identifies a main prize won for the wager placed on the video event. For a multi-reel slot video event, the wager outcome data may identify respective positions where each of reels 12 should stop spinning. For a video playing card event, the wager outcome data may identify which cards should be displayed for the user's hand and/or the dealer's hand.

At block 1210, client device 612 displays event symbols of the winning wager and a main prize won for the winning wager. As an example, for a multi-reel slot video event, the display of the main prize may be displayed at prize display 25, as shown in FIG. 2, and display of the event symbols may be displayed at symbol positions 34-48, as shown in FIG. 2.

At block 1212, client device 612 receives a selection of an event symbol. The event symbol may be selected via the example symbol selector. For a multi-reel slot video event, the selected event symbol may comprise an event symbol that is located on a winning pay-line of the video event. For a video playing card event, the selected event symbol may comprise an event symbol that represents a playing card in the user's hand of playing cards. At line 1214, client device 612 provides server 610 with event symbol selection data that identifies which event symbol has been selected.

At block 1216, client device 612 displays a prize symbol for the bonus prize. The prize symbol may be displayed at the symbol location of the event symbol selected at block 1212. FIG. 3 illustrates a prize symbol displayed at symbol position 41 and FIG. 5 illustrates a prize symbol displayed at symbol position 39. For a video playing card event, the prize symbol may be displayed at a symbol position of an event symbol representing a playing card in the user's hand of cards.

At block 1218, server 610 updates a user account with data associated with the winning wager. As an example, updating the user account may include updating a coin balance in the user account by subtracting the quantity of coins wagered and the quantity of coins won as a result of winning the wager placed on the video event. As another example, updating the user account may include updating one of the bonus prize counters 1106, 1108 with data that pertains to the bonus prize won for the video event.

A person having ordinary skill in the art will understand that the user account updates of block 1218 may occur during various stages of the carrying out the video event. For example, the coin balance data 1110 may be decremented in response to server 610 receiving the wager data at line 1204, the coin balance data 1110 may be incremented after the wager outcome is determined at block 1206, and counters 1106 or 1108 may be updated after server 610 receive event symbol selection data at line 1214. Other examples of the when the user account updates occur are also possible.

In an alternative embodiment, instead of determining the bonus prize associated with each symbol at block 1206, server 610 may determine the bonus prize after receiving the event symbol selection data at line 1214 and then communicate information identifying the bonus prize to client device 612 prior to block 1216.

In yet another alternative embodiment, the functions of blocks 1202, 1206, 1210, 1212, 1216, and 1218 may be carried out at a stand-alone video device, and the communications of 1204, 1208, and 1214 may occur via a system bus within the stand-alone video device, such as system bus 810.

4. Conclusion

Example embodiments of the present invention have been described above. Those skilled in the art will understand that changes and modifications may be made to the described embodiments without departing from the true scope and spirit of the present invention, which is defined by the claims.

I claim:

1. A method comprising:

setting, by at least one processor, a first counter within a computer-readable medium to an initial counter value, wherein the first counter tracks a quantity of counter prizes awarded to a player over the course of playing multiple video events from the initial counter value to a threshold value, wherein the initial counter value does not equal the threshold value;

setting, by the at least one processor, a second counter within the computer-readable medium to a bonus prize value, wherein the second counter tracks a quantity of redeemable bonus prizes awarded to the player as the first counter tracks the quantity of counter prizes over the course of playing multiple video events, and wherein redemption of any bonus prize based on the bonus prize value of the second counter is restricted until the first counter is set to the threshold value;

displaying, for each of the video events at a display device coupled to the at least one processor, an event symbol at each symbol position of an array of multiple symbol positions, wherein the event symbols to be displayed for each of the video events are determined anew for each of the video events by the at least one processor, wherein, for at least some of the video events, the displayed event symbols include two or more winning event symbols on a pay-line within the array that indicates a wager placed on the video event is a winning wager, and wherein each pay-line is defined by a subset of symbol positions within the array of multiple symbol positions;

determining, by the at least one processor, a main prize for each winning wager;

identifying, by the at least one processor for each winning wager, a single winning event symbol selected from the two or more winning event symbols on the pay-line within the array that indicates the wager placed on the video event is a winning wager, and wherein each winning event symbol of the two or more winning event symbols on the pay-line other than the single winning event symbol is a non-selected winning event symbol;

awarding, by the at least one processor, a next counter prize that results in the at least one processor setting the first counter to an updated counter value in response to selection of the single winning event symbol during an individual video event;

displaying, at the display device simultaneously, each non-selected winning event symbol of the two or more winning event symbols and a prize symbol that reveals the next counter prize, wherein the prize symbol is displayed at a symbol position of the display device at which the single winning event symbol was displayed when each of the two or more winning event symbols were displayed, and wherein the single winning event symbol is not displayed at the symbol position while the prize symbol is displayed at the symbol position;

displaying, at the display device, a first counter-display and a second counter-display during the playing of the multiple video events, wherein displaying the first counter-display includes displaying the updated counter value set in the first counter after both the player is awarded the next counter prize and the display device displays a prior counter value set within the first counter, wherein the updated counter value is in between the prior counter value and the threshold value, and wherein displaying the second counter-display includes displaying the quantity of redeemable bonus prizes; and performing, by the at least one processor after awarding a counter prize to the player that results in the first counter being set to the threshold value, an action to redeem at least one redeemable bonus prize awarded to the player.

2. The method of claim 1, wherein the at least one processor and the display device are contained within a stand-alone video device, wherein carrying out each video event includes displaying images of multiple spinning reels that comprise the event symbols displayed at each symbol position of the array, and wherein determining the main prize for the individual video event includes referring to a pay table that defines a pay-line that comprises the two or more winning event symbols as arranged on the display device for the individual video event before the prize symbol is displayed.

3. The method of claim 1, wherein the at least one processor and the display device are contained within a client device that communicates with a server to carry out the multiple video events, wherein carrying out each video event includes displaying images of multiple spinning reels that comprise the event symbols displayed at each symbol position of the array, and wherein determining the main prize for the individual video event includes referring to a pay table that defines a pay-line that comprises the two or more winning event symbols as arranged on the display device for the individual video event before the prize symbol is displayed.

4. The method of claim 1, wherein the prize symbol is randomly assigned to the single winning event symbol during the individual video event.

5. The method of claim 1, further comprising:

storing, at a non-transitory data storage device, computer-readable program instructions executable by the at least one processor; and executing, by the at least one processor, the computer-readable program instructions to carry out the method of claim 1.

6. The method of claim 1, further comprising:

displaying, at the display device, the main prize awarded for each winning wager during the video event in which the main prize was awarded;

receiving, by the at least one processor, selection information that identifies the single winning event symbol.

7. The method of claim 1, wherein each of the video events comprises a video multi-reel slot event that includes displaying multiple reels on the display device, wherein displaying the multiple reels for each of the video events includes displaying the multiple reels while the multiple reels are spinning and then while the multiple reels are stationary, and wherein, for each of video events that results in a winning wager, each of the two or more winning event symbols represents an event symbol on a respective reel of the multiple reels.

8. The method of claim 1, wherein selection of the single winning event symbol during the individual video event is performed by the at least one processor if a user did not select a winning event symbol to reveal the bonus prize prior to initiation of a next video event.

9. The method of claim 1, further comprising:

continuing to display, at the display device during each video event until a next video event is initiated, each symbol stopped at a symbol position of the multiple symbol positions other than the subset of symbol positions that define the pay-line.

10. The method of claim 9, further comprising:

outputting, by the at least one processor executing computer-readable program instructions, a prompt for a user to select a winning event symbol displayed at the display device, wherein outputting the prompt includes displaying a message on the display device outside of the symbol array or playing out the prompt audibly.

11. The method of clam 1, wherein the at least one processor is located within a server, wherein the display device is located within a client device, and wherein the at least one processor couples to the display device via a communication network that couples the server to client device.

12. The method of claim 11, wherein the server includes a non-transitory computer-readable medium containing the first counter and the second counter.

13. The method of claim 11, further comprising:

receiving, by the server from the client device for each of the video events, wager data entered by the player at the client device.

14. The method of claim 13, wherein the wager data indicates a quantity of pay-lines selected by the player and data for indicating at least one wager amount.

15. The method claim 1, wherein, for each of video events, the at least one processor determines each event symbol to be displayed in the array before displaying any of the event symbols for that video event.

16. The method of claim 1, wherein the array comprises three rows and five columns.

17. A device useable to carry out multiple video events, the device comprising:

a display device;

a non-transitory data storage device containing computer-readable program instructions;

at least one processor coupled to the display device, the at least one processor configured to execute the computer-readable program so that:

the at least one processor sets a first counter within a computer-readable medium to an initial counter value, wherein the first counter tracks a quantity of counter prizes awarded to a player over the course of playing multiple video events from the initial counter value to a threshold value, wherein the initial counter value does not equal the threshold value;

the at least one processor sets a second counter within the computer-readable medium to a bonus prize value, wherein the second counter tracks a quantity of redeemable bonus prizes awarded to the player as the first counter tracks the quantity of counter prizes over the course of playing multiple video events, and wherein redemption of any bonus prize based on the bonus prize value of the second counter is restricted until the first counter is set to the threshold value;

the display device displays for each of the video events an event symbol at each symbol position of an array of multiple symbol positions, wherein the event symbols to be displayed are determined anew for each of the video events by the last least one processor, wherein, for at least some of the video events, the displayed event symbols include two or more winning event symbols on a pay-line within the array that indicates a wager placed on the video event is a winning wager, and wherein each pay-line is defined by a subset of symbol positions within the array of multiple symbol positions;

the at least one processor determines a main prize for each winning wager;

the at least one processor identifies for each winning wager a single winning event symbol selected from the two or more winning event symbols on the pay-line within the array that indicates the wager placed on the video event is a winning wager, wherein each winning event symbol of the two or more winning event symbols on the payline other than the single winning event symbol is a non-selected winning event symbol, the at least one processor awards a next counter prize that results in the at least one processor setting the first counter to an updated counter value in response to selection of the single winning event symbol during an individual video event;

the display device displays simultaneously each non-selected winning event symbol of the two or more winning event symbols and a prize symbol that reveals the next counter prize, wherein the prize symbol is displayed at a symbol position of the display device at which the single winning event symbol was displayed when each of the two or more winning event symbols were displayed, and wherein the single winning event symbol is not displayed at the symbol position while the prize symbol is displayed at the symbol position;

the display device displays a first counter-display and a second counter-display during the playing of the multiple video events, wherein displaying the first counter-display includes displaying the updated counter value set in the first counter after both the player is awarded the next counter prize and the display device displays a prior counter value set within the first counter, wherein the updated counter value is in between the prior counter value and the threshold value, and wherein displaying the second counter-display includes displaying the quantity of redeemable bonus prizes; and the at least one processor performs, after awarding a counter prize to the player that results in the first counter being set to the threshold value, an action to redeem at least one redeemable bonus prize awarded to the player.

18. The device of claim 17, wherein the computer-readable program instructions include program instructions to increment the first counter, wherein the at least one processor executes the program instructions to increment the first counter in response to the at least one processor awarding each counter prize of the quantity of counter prizes, wherein the computer-readable program instructions include program instructions to increment the second counter, and wherein the at least one processor executes the program instructions to increment the second counter in response to the at least one processor awarding each redeemable bonus prize of the quantity of redeemable bonus prizes.

19. The device of claim 18, wherein one or more of the multiple video events occurs during a first video event session, wherein the first video event session ends before the at least one redeemable bonus prize is awarded to the player, wherein when the first video event session ends the first counter indicates a first value and the second counter indicates a second value, wherein the data storage device stores the first counter and the second counter after the first video event session ends such that when a next video event session is initiated after the first video event session ends the first counter indicates the first value and the second counter indicates the second value, and wherein performance of the action to redeem the at least one redeemable bonus prize occurs during the second video event session.

20. The device of claim 19, wherein the second video event session ends before redemption of at least one redeemable bonus prize awarded during the second video event session, and wherein the redeemable bonus prize awarded during the second video event session is no longer redeemable once the second video event session ends.

21. The device of claim 18, wherein performing the action comprises performing a video multi-reel slot event.

22. The device of claim 21, wherein the computer-readable program instructions comprise program instructions to carry out the video multi-reel slot event, and wherein execution of the program instructions to carry out the video multi-reel slot event causes a number of coins to be wagered on the video multi-reel slot event without deducting the number of coins from a coin balance of a user account.

23. The device of claim 17, wherein each video event that results in a winning wager includes the display device displaying multiple spinning reels that comprise the two or more winning event symbols, wherein each of the two or more winning event symbols for each winning wager is located on a respective reel of the multiple spinning reels.

24. The device of claim 17, further comprising:

a symbol selector configured for user selection of one of the two or more winning event symbols on the pay-line for each winning wager, wherein selection of a single winning event symbol for each winning wager is performed through use of the symbol selector during the video event resulting in the winning wager or by the at least one processor if a user did not use the symbol selector to select a winning event symbol to reveal the bonus prize prior to initiation of a next video event.

* * * * *

UNITED STATES PATENT AND TRADEMARK OFFICE

CERTIFICATE OF CORRECTION

PATENT NO. : 9,275,509 B2
APPLICATION NO. : 12/626652
DATED : March 1, 2016
INVENTOR(S) : Antoine Joubert Scholtz It is certified that error appears in the above-identified patent and that said Letters Patent is hereby corrected as shown below:

Title Page

Item (73) Assignee should read: Cork Group Trading LTD., Road Town, Tortola (VG)

Signed and Sealed this
Tenth Day of May, 2016

Michelle K. Lee
*Director of the United States Patent and Trademark Office*